US007308411B2

(12) United States Patent
Silverman et al.

(10) Patent No.: US 7,308,411 B2
(45) Date of Patent: Dec. 11, 2007

(54) METHOD OF PRESENTING LEASING ARRANGEMENTS

(75) Inventors: Michael J. Silverman, Wheaton, IL (US); Paul J. Muessig, Highland Park, IL (US); James J. Weber, Deerfield, IL (US)

(73) Assignee: Leo Software, Inc., Elk Grove Village, IL (US)

( * ) Notice: Subject to any disclaimer, the term of this patent is extended or adjusted under 35 U.S.C. 154(b) by 42 days.

(21) Appl. No.: 11/093,241

(22) Filed: Mar. 29, 2005

(65) Prior Publication Data

US 2005/0222861 A1  Oct. 6, 2005

Related U.S. Application Data

(60) Provisional application No. 60/558,661, filed on Apr. 1, 2004.

(51) Int. Cl.
*G06Q 99/00* (2006.01)

(52) U.S. Cl. ............................................ 705/1; 715/502
(58) Field of Classification Search .................... 705/1; 715/502
See application file for complete search history.

(56) References Cited

U.S. PATENT DOCUMENTS

| 6,023,687 | A | 2/2000 | Weatherly et al. |
| 6,671,697 | B1 | 12/2003 | Thibodeau |
| 6,784,567 | B1 * | 8/2004 | Klitzner .................... 307/9.1 |
| 2001/0037273 | A1 | 11/2001 | Greenlee, Jr. |
| 2002/0049624 | A1 | 4/2002 | Raveis, Jr. |
| 2002/0062218 | A1 | 5/2002 | Pianin |
| 2002/0062277 | A1 | 5/2002 | Foster et al. |
| 2002/0065739 | A1 | 5/2002 | Florance et al. |
| 2002/0087349 | A1 | 7/2002 | Wong |
| 2002/0152222 | A1 * | 10/2002 | Holbrook .................. 707/104.1 |
| 2003/0004861 | A1 | 1/2003 | Amend et al. |
| 2003/0078878 | A1 | 4/2003 | Opsahl-Ong |
| 2003/0093289 | A1 | 5/2003 | Thornley et al. |
| 2004/0044696 | A1 | 3/2004 | Frost |

FOREIGN PATENT DOCUMENTS

JP    2001312546 A  * 11/2001

OTHER PUBLICATIONS

Information on Realtor Workstation, copyright 2000.*

* cited by examiner

*Primary Examiner*—Naresh Vig
(74) *Attorney, Agent, or Firm*—Marshall, Gerstein & Borun LLP

(57) ABSTRACT

A method and apparatus are provided for presenting leasing arrangements for a plurality of rental spaces. The method includes the steps of providing a graphical user interface that depicts the plurality of rental spaces within a two-dimensional layout on a display of the graphical user interface, where a relative size and relative location of each rental space on the display is proportional to a relative physical size and relative location of the actual rental spaces and associating a menu with at least some of the rental spaces on the display where the menu provides additional information regarding the rental space, building, rental space user prospects and associated documents.

22 Claims, 12 Drawing Sheets

METHOD OF PRESENTING LEASING ARRANGEMENTS

FIELD OF THE INVENTION

The field of the invention relates to rental spaces and more particularly to methods of presenting, centrally storing, accessing, tracking and securing leasing information and arrangements.

BACKGROUND OF THE INVENTION

Methods of tracking, managing, marketing and leasing rental space are traditionally highly decentralized, with the potential for the dissemination of incomplete, stale or inaccurate information. A building owner or manager may write a description of the space and place advertisements in newspapers or trade journals.

Alternatively, the owner or manager may contact one or more leasing agents for help. The leasing agent may obtain information about the space from the manager or owner and enter the information into his or her own personal database. The leasing agent may augment the information by traveling to the space and taking pictures or making notes as to the features of the space.

In general, the real estate leasing business is highly competitive and real estate agents often do not share information. Often one agent who goes to view a leasing space will keep any additional information that he has collected in his or her own personal files without sharing that information with other agents.

In addition, real estate agents often receive requests for rental space from third party rental space users. As with rental spaces, the agents may share some information about potential renters, but keep other information for their own personal use.

In order to match rental spaces with users, a rental agent will often prepare and send rental proposals to users containing whatever limited information the agent may have. Users often receive multiple proposals for various competing rental spaces from different agents. Users may accept a space that is less than ideal because of the differences in available information.

While present methods of presenting real estate information to users works relatively well, the inherent differences in the availability and accuracy of information often works to the detriment of the building owner or manager. Accordingly, a need exists for a method of presenting information to potential renters that allows more control by the building owner or manager.

BRIEF DESCRIPTION OF THE DRAWINGS

FIG. 14 is a Web Page generated after selecting the Generate Website softkey of the Stacking Plan screen that may be used by the system of FIG. 1;

FIG. 17 is a Leases screen that may be used by the system of FIG. 1;

SUMMARY

A method and apparatus are provided for gathering, centrally storing, tracking, managing and presenting information and leasing arrangements for a plurality of rental spaces. The method includes the steps of providing a graphical user interface "Stacking Plan" that depicts the plurality of rental spaces within a two-dimensional layout on a display of the graphical user interface, where the relative size and relative location of each rental space on the display is proportional to the relative physical size and relative location of the actual rental spaces and associating a menu with at least some of the rental spaces on the display where the menu provides additional information regarding the rental space, building, user prospects and acts as a collaborative web-based filing cabinet for associated documents.

DETAILED DESCRIPTION OF AN ILLUSTRATED EMBODIMENT

Figure 1:
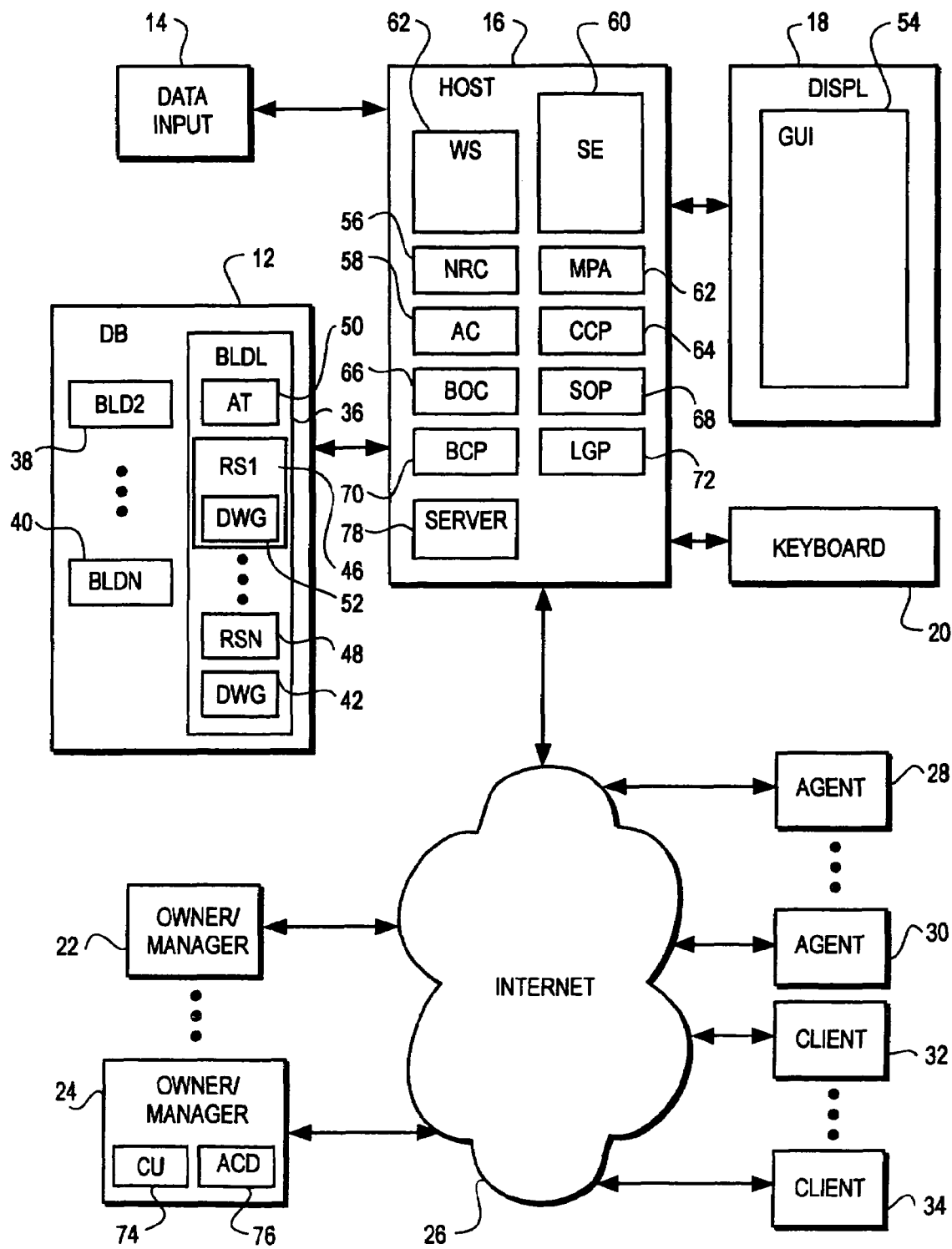
FIG. 1 is a block diagram of a system for presenting leasing arrangements in accordance with an illustrated embodiment of the invention.

FIG. 1 is a block diagram of a rental space tracking and presentation system 10 shown generally in accordance with an illustrated embodiment of the invention. Under the illustrated embodiment, the rental space tracking and presentation system 10 may be licensed to or used by a building owner or manager or by a third party service provider. In the case where the system 10 is owned by a third party service provider the system 10 may provide access to the information of real estate spaces of many owners or managers.

The tracking and presentation system 10 may be used by the owner or manager as a repository of records for each rental space controlled by the owner or manager. In the case where a third party service provider controls the system 10, the system 10 may be partitioned where each owner or manager may keep records, in a secure manner, for each rental space.

In any case, the system 10 may have a multi-level security system. For example, the highest or root level of security may be allocated to the building owner or manager. The owner or manager may control access levels for real estate agents and potential or actual rental space users (renters).

For example, real estate agents may be provided access to graphical information of the physical layouts of the buildings and available rental spaces and to expected rental rates, taxes, building amenities, and so on, but would not be allowed access to the leasing information of existing tenants. Similarly, potential renters may be allowed access to private web sites generated by the system 10 and created by real estate agents for proposals directed to potential renters and to public web sites generated by the system 10 and provided by the building owner or manager, but not to information about other tenants.

In general, the system 10 provides a first functionality for the building owner/manager, a second functionality for rental agents and other members of the leasing team (including architects, contractors, etc.) and a third functionality for potential renters and existing tenants. For the building owner/manager, the system 10 functions as a database that captures and provides information and associated documents on tenants, tenant prospects, leasing activity and the economic health of each building. The owner/manager may share as much or as little information with rental agents, potential renters or existing tenants as the owner/manager should choose.

In general, the owner/manager may maintain a set of drawings, photographs and related documents 42 for each building 36, 38, 40 and also a set of drawings, photographs and related documents 52 for each rental unit. The owner/manager may allow access to these drawings, photographs and related documents by the rental agents 28, 30 for purposes of attracting renters.

Similarly, the owner/manager may also maintain an amenities file 50 for each building 36, 38,40. An amenities file may include information such as the presence of a building cafeteria, parking, public transportation, tenant controlled air conditioning, private elevators, security systems, etc. An amenities file may be provided in the form of text and graphics.

With the date adjustable graphical interface the owner/manager may determine the current or future availability of rental space within a specific building or set of buildings. In the case where the owner/manager finds that he/she has available rental space, the owner/manager may contract with one or more real estate agents 28, 30 to find renters for the available space. In order to facilitate the identification of potential renters, the owner/manager may grant limited access by agents 28, 30 to the system 10 for purposes of facilitating the rental of any available space. The owner/manager may allow the agent 28, 30 access to a rental space file 46 of any available spaces (including drawings, photographs and associated documents 52 regarding the rental space) building drawings 42 and to the amenities file 50. The rental space file 46 may contain such information about the rental space (e.g., square footage, floor layout, proposed rent, photographs of the space, etc.) as the owner/manager should decide is sufficient to facilitate rental of the space through the agent 28, 30.

In addition to access to rental units, the agent 28, 30 may also be given access to the search and presentation features of the system 10. The search feature allows an agent 28, 30 to enter search terms into an interactive window regarding the type of rental space that a client (potential renter) is interested in. Search terms may include a desired rent, size (square footage) of the rental space, building amenities, area, etc.

Once a list of potential rental spaces has been identified, the system 10 allows the agent to automatically create a private web site for use by the selected clients of the agent 28, 30 that incorporates the information of one or more identified rental spaces. The agent 28, 30 may send an e-mail to the client with a hyperlink to the system 10 created private web site.

The system 10 created web site may be structured to respond to queries only from a source address of the identified client of the agent 28, 30. The use of a private web site of this type allows the agent 28, 30 to conduct confidential negotiations with clients 32, 34 without fear that offers and counteroffers would fall into the hands of competitors.

Turning now to the system 10, an explanation will be provided of the features and advantages available to owners/managers and to agents and renters through the use of the system 10. In general, the system 10 includes a host 16 coupled to the Internet 26. Owners/managers may access the system through the Internet 26 or may access the system 10 through a local area network (LAN) from a terminal that includes a display 18 and keyboard 20.

Attached to the host 16 may be a data input device 14 for receiving information regarding the physical layouts of the rental units (e.g., a CAD/CAM system). A database 12 may also be provided for storing data about rental units.

Figure 2:
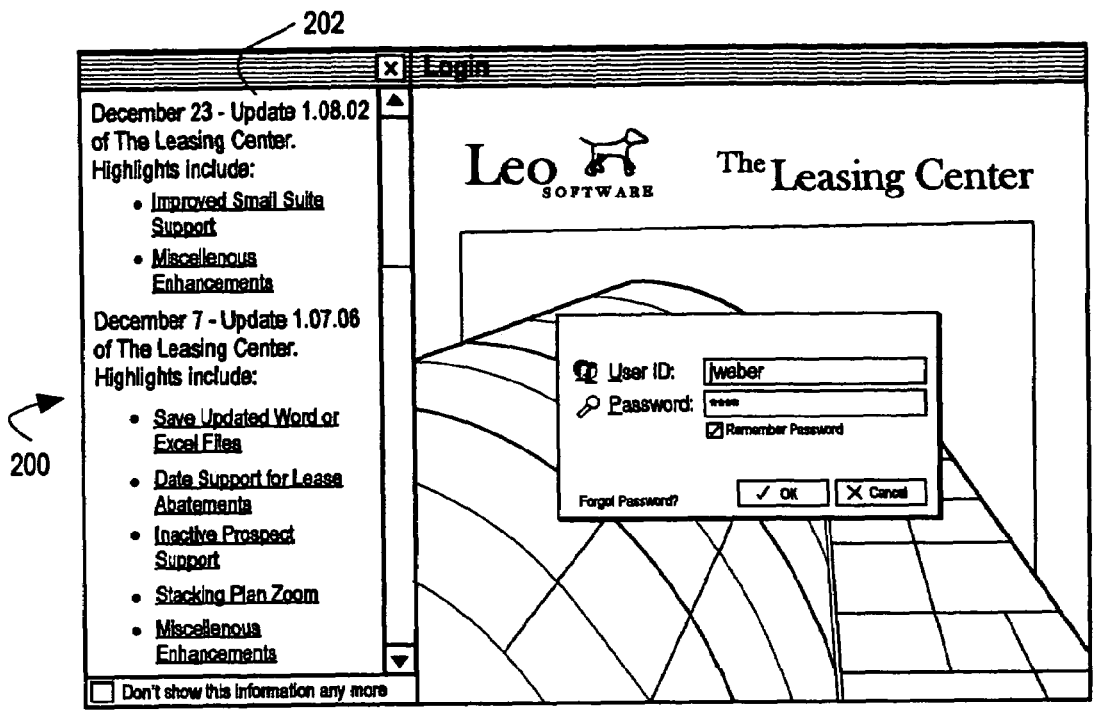
FIG. 2 is a log on screen that may be used by the system of FIG. 1.

In general, control of the system 10 may be provided through the use of a graphical user interface (GUI) 54. By inputting their user ID and password, a user can log onto the system 10 from any computer with an internet connection. FIG. 2 depicts a Log-on screen 200, which Log-on screen 200, may also display user aids 202. These aids 202 could be hints for using the system 10 or announcements of upcoming releases or version highlights.

Figure 3:
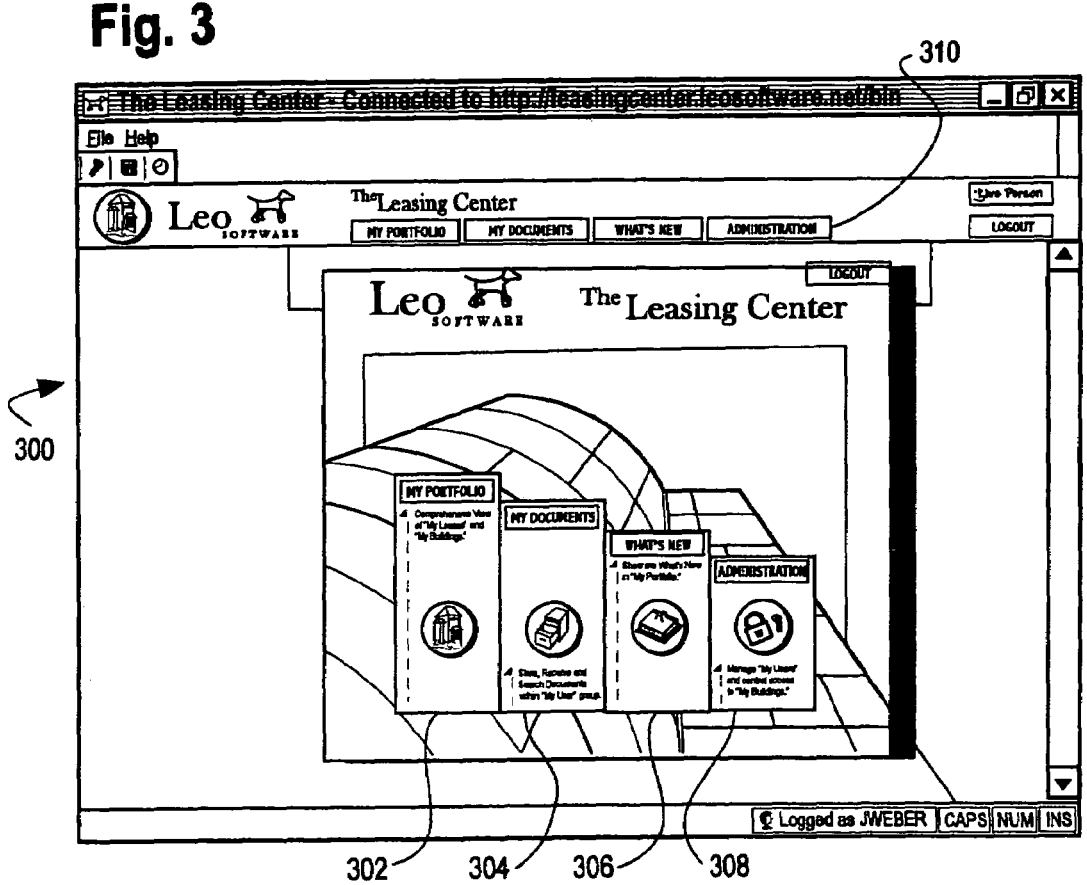
FIG. 3 is a home page that may be provided by the system of FIG. 1

FIG. 3 depicts a Home Page 300 (FIG. 3) that may appear on the GUI 54. After log-on, the first screen displayed may be the Home Page 300 (FIG. 3) that contains four softkeys (buttons) My Portfolio 302, My Documents 304, What's New 306 and Administration 308 that together provide a menu of features available through the system 10. The user may go directly to any one of these sections by clicking on the appropriate button 302, 304, 306, 308. Each area may also be accessible from the tool bar 310 located at the top of the Home Page 300 (FIG. 3).

Clicking on the Administration button 308 may bring the user to one of three functional areas including the Building Access Manager, Role Manager or the User Manager depending upon which function the user last used.

Figure 4:
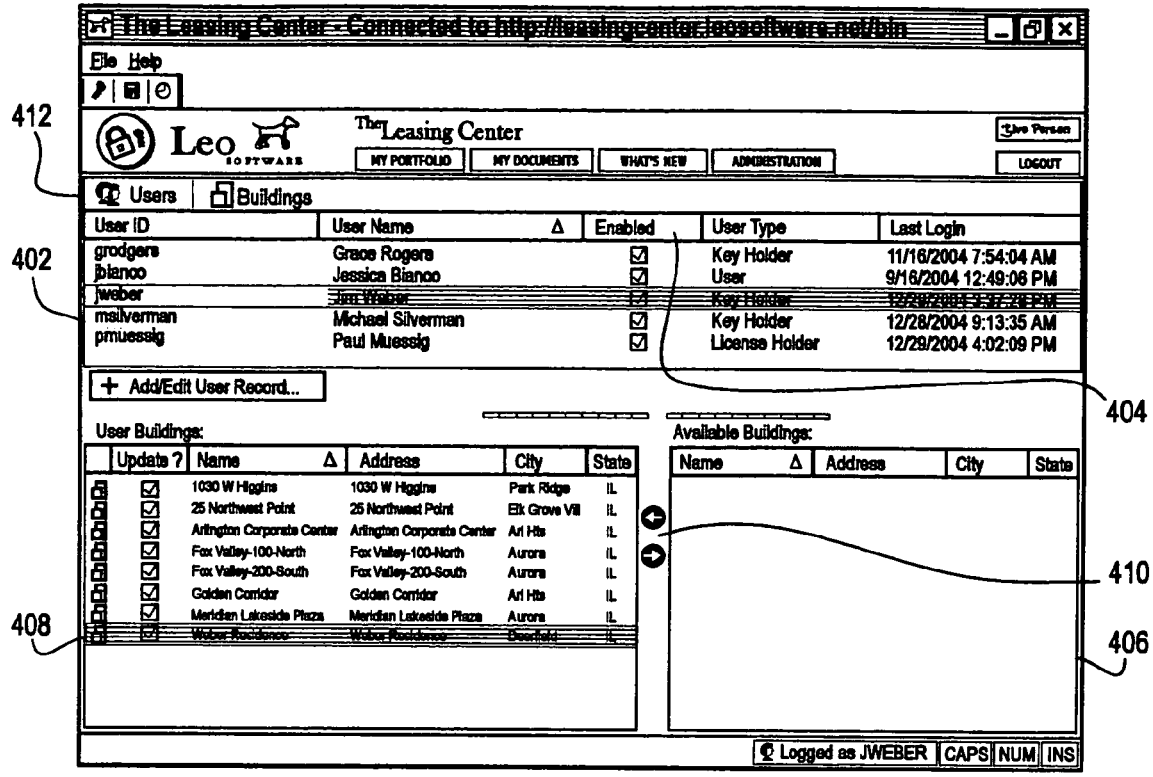
FIG. 4 is a User Manager screen that may be used by the system of FIG. 1.

Activation of the Administration softkey 308 may take a user to the User Manager screen 400 (FIG. 4). Within the User Manager screen 400 (FIG. 4), the owner/manager may select the various levels of permission or security that will be discussed below. Shown on the top area 402 is a user ID, user name, user type, last date of login and user enabled box for each user. A first level of security may be provided by right clicking on a user record and activating or deactivating the user enabled checkbox 404. Deactivating a user enabled checkbox 404 may deny that user access to the system 10. For each active user a list of buildings to which the user does not currently have access, but may be granted access appears in the lower right area 406. In the lower left area, a list of buildings to which the user may currently have access 408 is shown. A second level of security may be provided by granting or removing access to a particular building by clicking on the named building then transferring that building between 406 and 408 by clicking on the appropriate transfer button 410. Transfer to the Building Access Manager or the Role Manager may be accomplished by clicking on the appropriate softkey 412.

Figure 5:
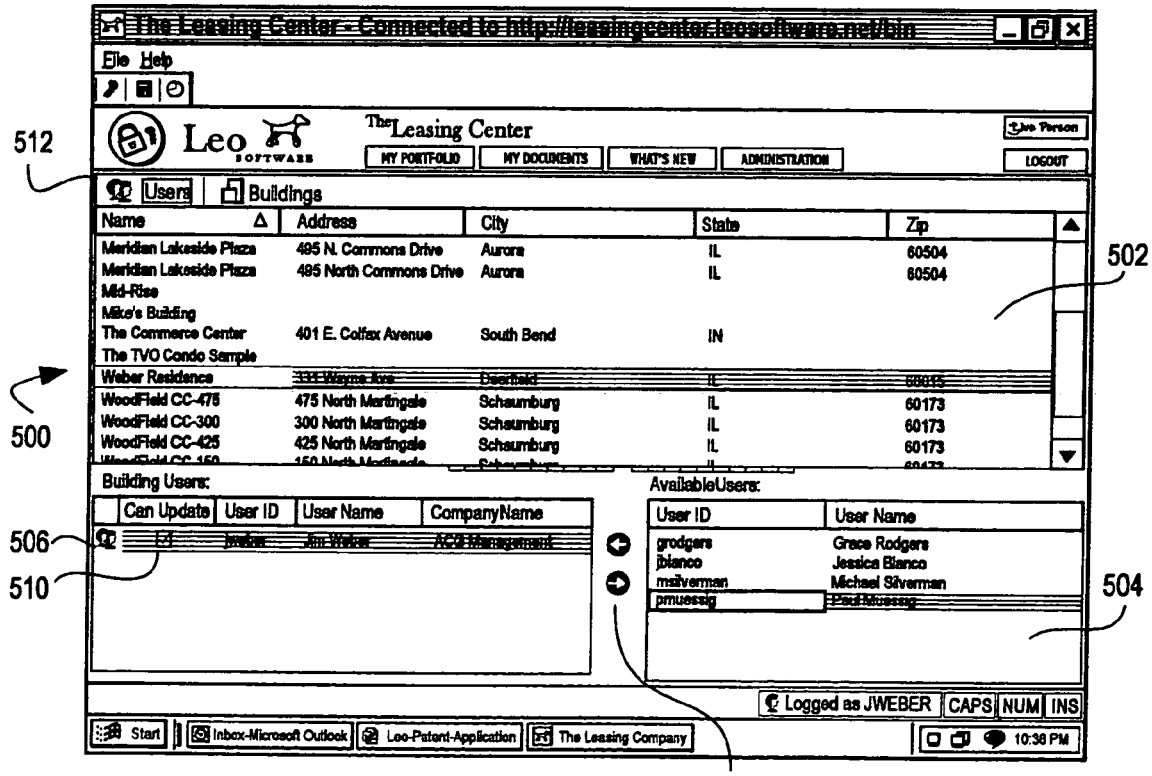
FIG. 5 is a Building Access Manager screen that may be used by the system of FIG. 1.

Activation of the Administration softkey 308 may take a user to the Building Access Manager screen 500 (FIG. 5). Within the Building Manager Access screen 500 (FIG. 5), the owner/manager may select the various levels of permission or security that will be discussed below. Shown on the top area 502 is building ID with the name and address for each building. For each active building a list of available users may appear in the lower right area 504. In the lower left area 506 a list of users who currently have access to the building may be shown. A first level of security may be provided by granting or removing access to a particular building by clicking on the named user and transferring that user between 504 and 506 by clicking on the appropriate transfer button 508. A second level of security may be provided by activating or deactivating the ability to update building records and files for each user. Deactivating a user update checkbox 510 may limit the user's access to view only. Transfer to the User Manager or the Role Manager may be accomplished by clicking on the appropriate softkey 512.

Figure 6:
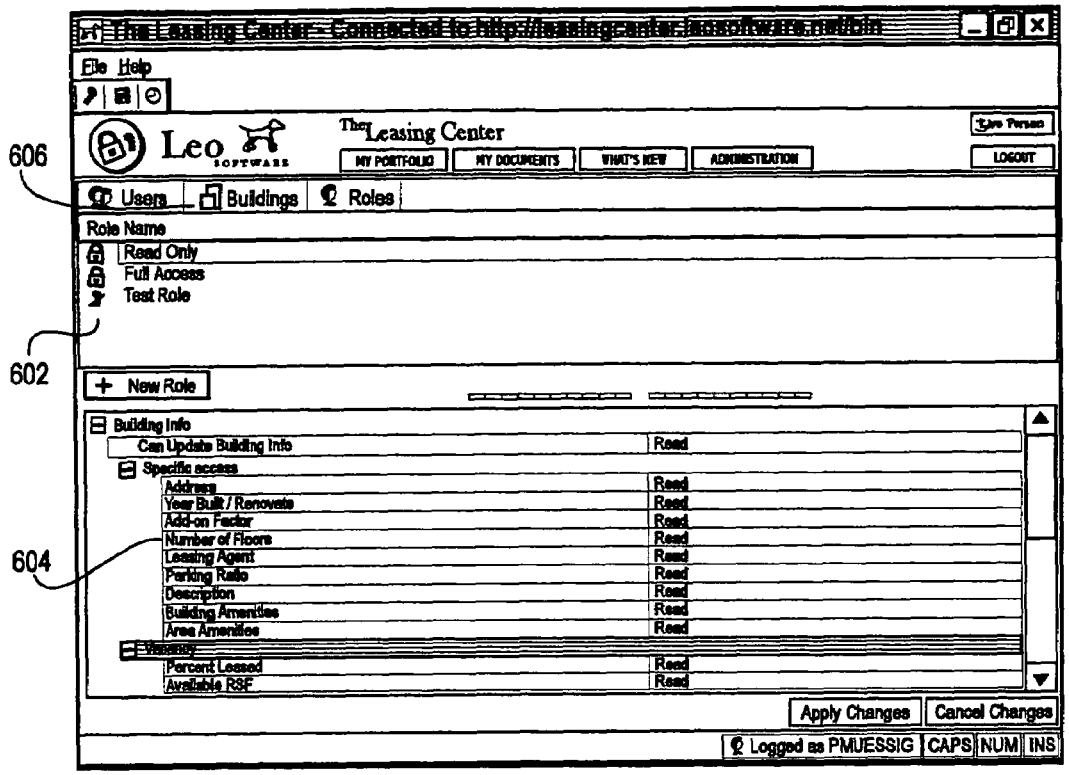
FIG. 6 is a Role Manager screen that may be used by the system of FIG. 1.

Activation of the Administration softkey 308 may take a user to the Role Manager screen 600 (FIG. 6). Within the Role Manager screen 600 (FIG. 6), the owner/manager may select the various levels of permission or security that will be discussed below. Shown on the top area 602 is a list of roles that may be assigned to active users. A unique role may be created and defined by the level of access granted to each of the major database fields. In the lower area 604 a list of the various levels of permission granted to each of the major database fields for a particular role may be shown. A level of security may be provided by assigning a defined role to a user and thereby granting or removing access to particular major database fields. Transfer to the User Manager or the Building Access Manager may be accomplished by clicking on the appropriate softkey 606.

Figure 7:
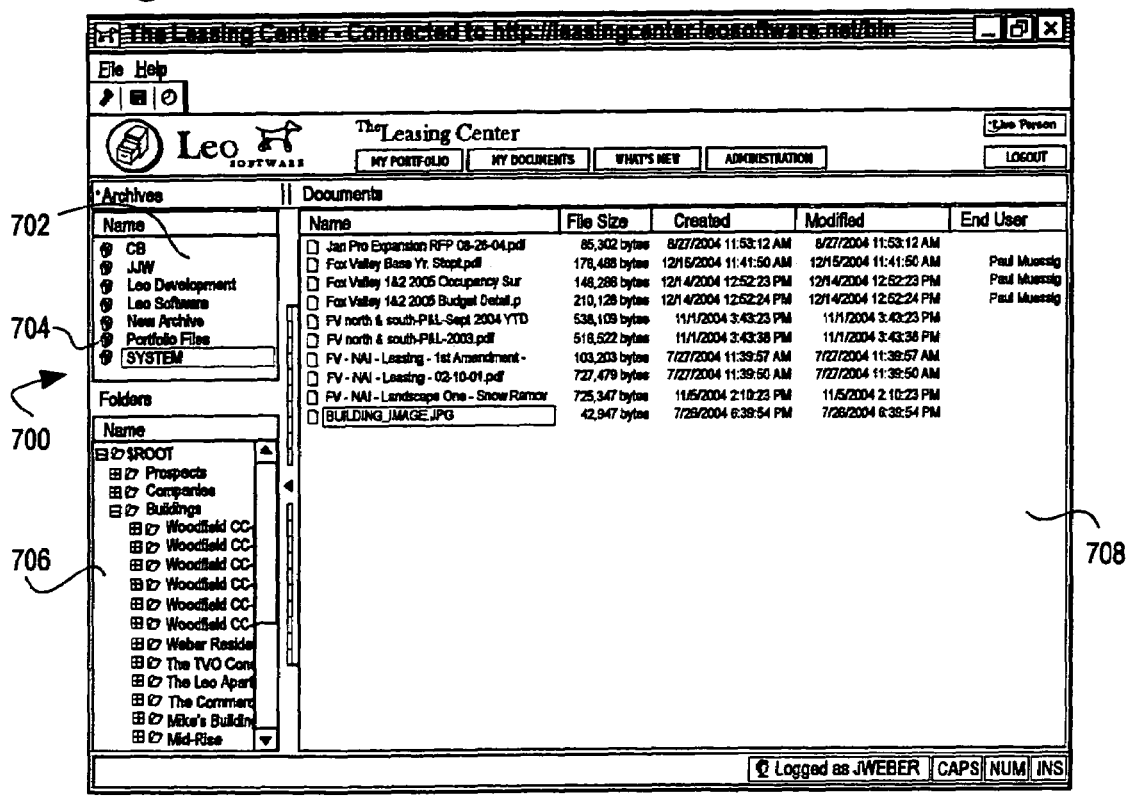
FIG. 7 is a Document Archives screen that may be used by the system of FIG. 1.

Clicking on the My Documents button 304 brings the user to the Document Archives screen (the Archival Browser section) 700 (FIG. 7). In this area the user may archive, retrieve and transmit via e-mail any number of documents relative to a building, suite or tenant or create private archives for the user's personal use. This may be where a leasing agent quickly retrieves the space plan layouts that have been previously prepared for past prospects for a certain suite. Alternatively, the Document Archive screen 700 (FIG. 7) may be where a user may locate the documents associated with a tenant or a building. The Archive screen 700 (FIG. 7) may be a significant feature of the system 10 because it allows for quick up-loading of large quantities of documents thereby making initial system set up that much easier.

The Document Archive screen 700 (FIG. 7) may be divided into three sections. The upper left section 702 may contain a list of available archives, including the System Archive and any other archives created by the user. The System archive 704 may contain a multi-level directory of every drawing, photo and document associated to any building, rentable space, tenant or tenant prospect entered into the system 10 database 12.

Figure 8:
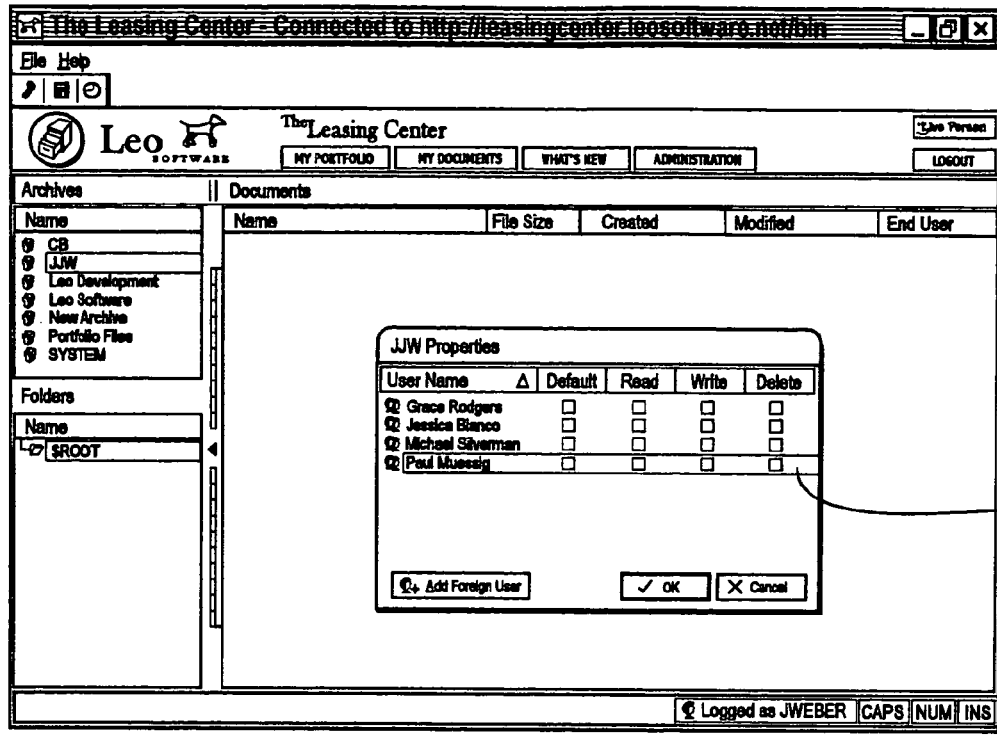
FIG. 8 is a Document Security window that may be used by the system of FIG. 1.

The lower left section 706 may contain a list of folders and subfolders associated to an active archive. Any documents contained within an active folder may be displayed on the right side of the screen 708. Each document may be identified by name, file size, creation date, last modification date and the name of the user who last modified the document. A document may be accessed by double clicking on the document name. Right clicking on a document, folder or archive opens a drop down menu that may offer various options, including a Properties button. Clicking the Properties button opens a Document Security window 800 (FIG. 8) identifying 802 the system 10 users that may have access to that document, folder or archive. A level of security may be provided by limiting the level of access of the identified users or of identified roles as defined in the Role Manager Screen 600 (FIG. 6).

Clicking on the My Portfolio softkey 302 causes the GUI 54 to return to the last used screen of five My Portfolio screens. The five screens are Buildings, Leases, Prospects, Stacking Plan and the Building Details. These screens may be used to manage the records for buildings, leases, tenants, suites and prospect contacts.

Figure 9:
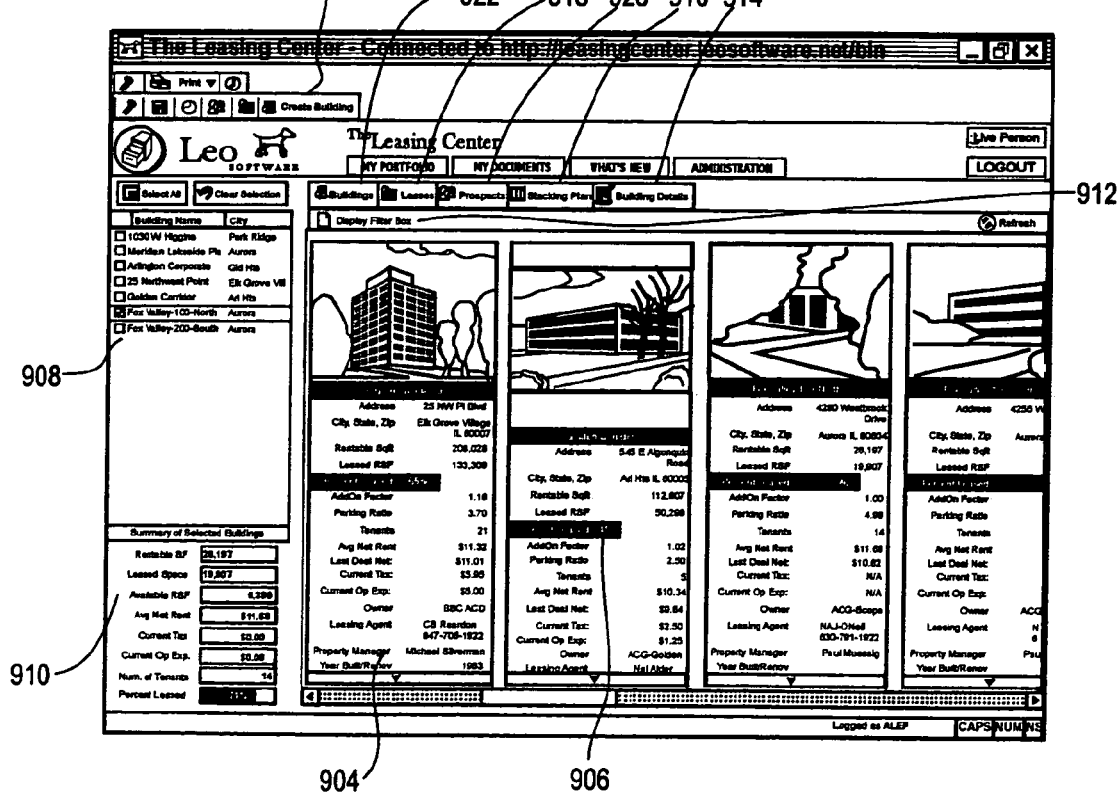
FIG. 9 is a Buildings screen window with a Create Building window that may be used by the system of FIG. 1.

The Buildings screen 900 (FIG. 9) is where a building may be first created within the system 10, where the owner/manager may view summaries of buildings that are already present within the system 10, view a cumulative summary of user selected portfolios of buildings and may search the system 10 database 12 for buildings that meet various user identified criteria.

The Buildings screen has a softkey 902 entitled "Create Building". When the owner/manager clicks on the softkey 902, a dropdown menu appears giving the owner/manager the option of importing or inputting data.

Figure 10:
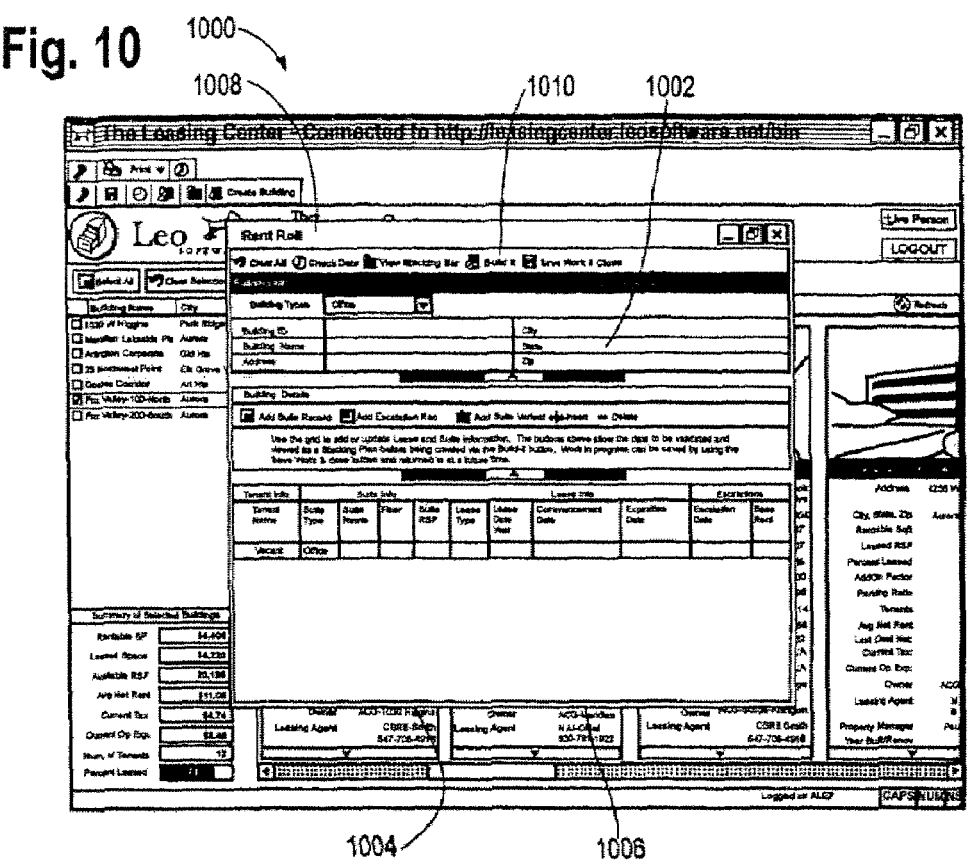
FIG. 10 is a Rent Roll window that may be used by the system of FIG. 1.

If the owner/manager opts to input the data, an interactive Rent Roll window appears 1000 (FIG. 10) allowing the owner/manager to enter building information 1002 (building name, address, etc.), suite information 1004 (number of rental spaces, size in square feet of each space, etc.) and lease information 1006 (commencement date, termination date, etc. for each space within the building. Using the Rent Roll window 1000 (FIG. 10) the owner/manager may create a file that describes a structure of any size. After data is entered into the appropriate fields of the Rent Roll window 1000 (FIG. 10), the user may activate the Check Data button 1008 and the system 10 will review the building, suite and lease information entered and display a list of potential entry errors. After the owner/manager corrects the errors, the system 10 may create the building in the database 12 when the user activates the Build-It button 1010. Once the building stacking plan has been created the user may complete the fields for the new building record by proceeding to the Building Details screen 1100 (FIG. 11).

If the owner/manager opts to import the data from a CVS file to the system 10 database 12, a dialog window appears leading the owner/manager through the process of importing files from other existing spread sheets or databases. Because users of the system 10 may have existing projection and accounting data files, the import feature significantly reduces the difficulty of data entry. When the import process is complete the same Rent Roll window 1000 (FIG. 10) appears as when the user requests the input data feature, enabling the system 10 error checking procedure. After the user corrects the errors, the system 10 creates the building in the database 12 by activating the Build-It button 1010. Once the building has been created, the user may complete the fields for the new building record by proceeding to the Building Details screen 1100 (FIG. 11).

Figure 11:
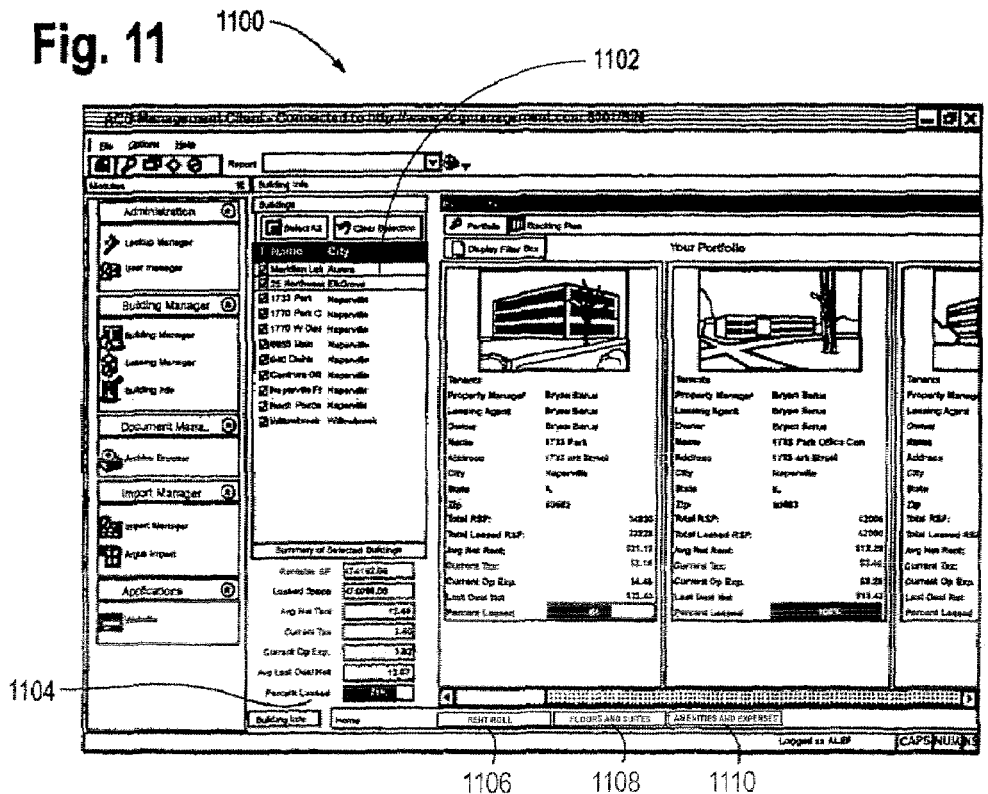
FIG. 11 is a Building Details screen that may be used by the system of FIG. 1.

Once data about a building has been entered, a user may gain access to the information by activation of the Buildings screen 900 (FIG. 9) or the Building Details screen 1100 (FIG. 11). When users first activate the Buildings screen 900 (FIG. 9), they may be presented with a series of windows (i.e., a card catalog) 904 on the right side of the screen of all of the buildings to which the user has access. There may be no limit to the number of buildings that can be loaded onto the system 10 by an owner/manager, however, each user can only view those buildings for which they have received permission from the system administrator.

As shown in the card catalog 904, each building entered into the system 10 may be displayed on a card which includes (below a building image) user selected data fields such as name, address, rentable square feet, number of tenants, amount of leased space, average net rent, tax and operating expenses and the net rent for the last lease signed. Each building card may also contain a thermometer scale (horizontal bar chart) 906 indicating by the length and color of the bar the occupancy (health) of the building along with a trending arrow. In this case, a building occupancy processor 66 collects data regarding the leased space versus total space and assigns a predetermined color to the bar based upon the occupancy. The color red may be used as a negative indicator for an empty building. As the building space is leased and occupancy improves, the scale color gradation approaches green representing a healthy property condition. Because of the graphic representation of the system 10, the user in a glance can determine the health of all of the buildings shown on the display 18.

The user may change which buildings are shown on the Buildings screen 900 (FIG. 9) by either manually selecting the buildings from the list to the left of the active window 908 (a summary of critical building information for the selected buildings appears below the list of available buildings 910) or by clicking on the Display Filter Box softkey 912 located above the card catalog window 904. The Display Filter softkey 912 allows the user to search for a particular space based upon a set of search parameters.

Figure 13:
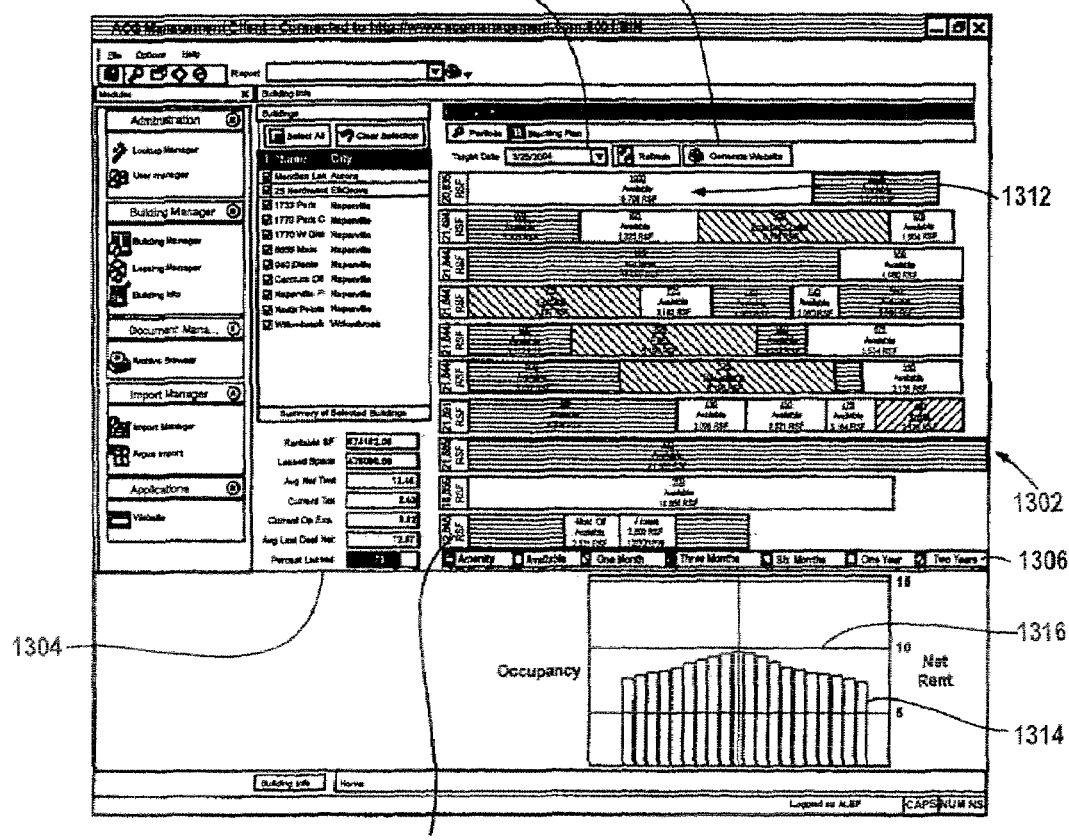
FIG. 13 is a Stacking Plan screen with a proposal generator wizard that may be used by the system of FIG. 1.

The Display Filter softkey 912 activates a search engine 60 that may allow a user to search for and display only those buildings that meet certain criteria. The search criteria may be selected from the features that were previously entered into the system 10 within the Building Details screen 1100 (FIG. 11). Once a search is complete, the system 10 may display a card for every building that has the space available to meet the search parameters. The user may then review those spaces that meet the search criteria for size, price or amenities by going to the Stacking Plan screen 1300 (FIG. 13). By right clicking on a space identified on the Stacking Plan screen 1300 (FIG. 13) and activating the drop down menu associated with each space, the user may review the features of the space as well as the amenities and any photos or documents associated with that space.

The user may for example enter a suite size (square footage range) or rental rate or location or amenities or any combination of features when conducting a search for buildings and space. The leasing agent (as user) might query the system 10 to locate buildings with certain amenities, such as 24-hour security or covered parking. Alternatively, by entering a leasing agent's name, the search engine 60 becomes a management tool that may help managers track the performance of a particular agent's group of listings.

Clicking on the Building Details softkey 914 in the Buildings screen 900 (FIG. 9) opens the Building Details screen 1100 (FIG. 11) that may describe the floors and suites and where the owner/manager may select (or enter) amenities available for each new building and enter operating expense information. On the top of the Building Details screen 1100 (FIG. 11) a small photo of the building may appear, along with the address, the names of the owner, leasing agent, lender, and manager, and other basic information about the property. As with the Buildings screen 900 (FIG. 9), the names of the available buildings may appear in the upper left corner 1102 of the Building Details screen 1100 (FIG. 11). The bottom section 1104 of the Building Details screen 1100 (FIG. 11) may be controlled by three tabs that may be found in the middle of the screen; Rent Roll 1106, Floors and Suites 1108, and Amenities and Expenses 1110.

The Rent Roll tab 1106 may open a Rent Roll window 1000 (FIG. 10) in the bottom section 1104 of the Building Details screen 1100 (FIG. 11) that provides a list of all tenants for a selected property, including suite name and size, rent payment schedule, and lease commencement and expiration dates.

Figure 12:
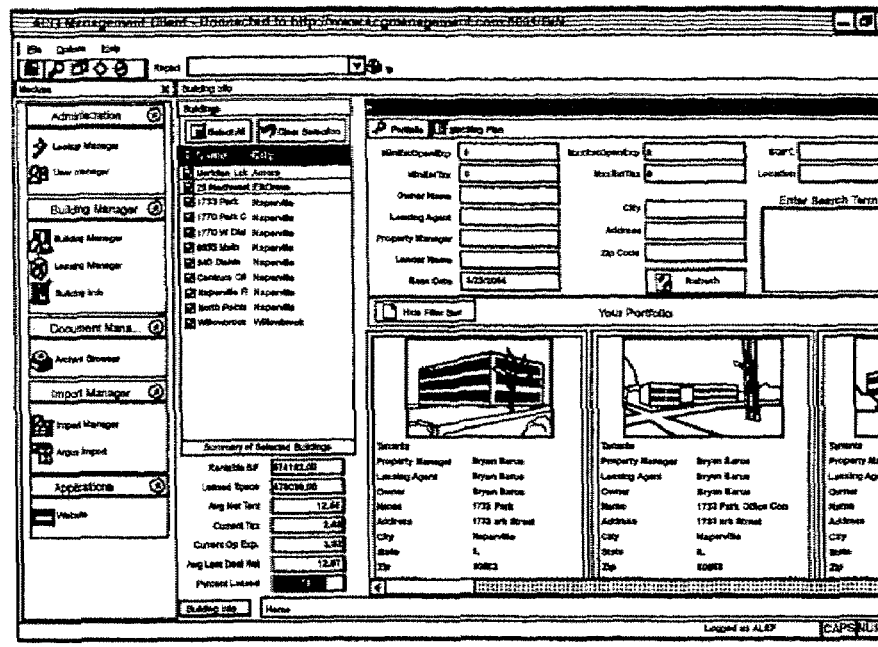
FIG. 12 is a Floor and Suites Details screen that may be used by the system of FIG. 1.

The Floors and Suites tab 1108 may open a Floors and Suites Details window 1200 (FIG. 12) at the bottom 1104 of the Building Details screen 1100 (FIG. 11) that may allow the user to enter information to describe each floor in a building, the suites found on each floor, and the amenities provided within each suite. The top right of the Floors and Suites Details window 1200 (FIG. 12) contains a floors and suites filter box 1202 with fields for operating expenses, estimated tax, rentable square footage and other information including search terms.

The user may use the Amenities & Expenses softkey 1110 to open an Amenities & Expenses window (not shown) at the bottom 1104 of the Building Details screen 1100 (FIG. 11) to list the estimated and actual historic and current annual operating expenses and taxes for a selected property. These values are important because they are used by a net rent calculator 56 within the system 10 to calculate the net rent value of each gross lease that exits and has been entered into the system 10. The net rent calculator 56 provides a net rent value to the owner/manager for each tenant. An averaging calculator 58 may provide an average for the building based upon net rents in order to give the user a sense of the economic health of the property or the value of space in the building.

The user may also describe the building amenities (such as a health club, free parking, locker rooms, local retailers, or concierge service) of the area amenities (such as hotels, restaurants or public transportation) or anything the owner/manager wants highlighted as a feature of the various buildings 36, 38, 40. Typical building amenities loaded into the system may include features such as structured parking, 24 hour security, 24 hour building access with tenant controlled HVAC. These amenities may be later selected to describe a building when the user is using the filter section after selecting the Display Filter Box softkey 912 in the Buildings screen 900 (FIG. 9) to search for only those building and/or rental spaces that have those specific amenities.

Clicking on the Stacking Plan softkey 916 in the Buildings screen 900 (FIG. 9) results in presentation of the Stacking Plan screen 1300 (FIG. 13). The stacking plan 1302 is a two-dimensional layout of the building on the display 18 where a relative size and relative location of each rental space shown on the display is proportional to a relative physical size and relative location of the actual rental spaces.

The stacking plan 1302, when properly loaded with suites, leasing information and associated documents, becomes a central navigation tool of the system 10 and a filing cabinet for associated documents.

The user places a cursor over a rental space. A menu processing application 62 detects the position of the cursor on the two-dimensional array. When the menu processing application 62 detects activation on a switch on a mouse used with the cursor the menu processing application retrieves and displays a drop down menu that may allow the user to (a) access rental space information including a list of all associated documents to that space, (b) generate a proposal for the rental of the subject space using a system 10 proposal generator wizard, (c) create or display an abstract for any leases associated with the rental space, (d) demise a rental space, or (e) merge two or more rental spaces.

FIG. 13 depicts an example of the way-finding-stacking-plan 1302 for one particular building. The way-finding-stacking-plan 1302 is a unique navigating device created for the system 10. This visual tool offers an enormous amount of information to the viewer. A building summary card 1304 (discussed above with reference to FIG. 9) provides a summary for the building.

Each rental space of the stacking plan 1302 may be color-coded based upon the length of time remaining on a lease, or in the case of multi-family property based upon the length of time the rental space has been vacant. The color code selected by the user is shown along the bottom 1306 of the two-dimensional layout of rental spaces. An available space may be colored white, a space with one month left on a lease may be colored red, a space with two months may be colored orange and so on. In this case, a space occupancy processor 68 retrieves leasing information regarding each space from the database 12, determines a time left on the lease calculated prospectively from the target date selected by the user and shown in the target date box 1308 and colors the space accordingly.

By viewing a color-coded cross-section of the building, the user sees not only how much vacancy is in the building, but also where it is and where it will be as of the target date selected by the user. In the example of FIG. 13, the color code of the spaces is shown along the bottom of the screen based upon how much time remains until the lease expires.

By using the stacking plan 1302, the user sees where tenants are located, their relative size and lease expirations date. The user also sees space that is leased but unoccupied, as well as what options or encumbrances might exist on any spaces. By clicking on any space identified on the stacking plan 1302 and activating the drop down menu associated with each space, the user may review the features of the space, as well as, a lease abstract and any photos or documents associated with the space.

As shown, a marginal space on the left side of each floor shows the size of the floor 1310. Each entry of the two-dimensional layout includes a space identifier, the space's status and the square footage of the space. As mentioned above, placing a cursor over space identifier (e.g., 1312) activates the drop-down menu that offers the specifics of the space.

In the case of a one-story office building, retail, multi-family apartments or an industrial facility, the stacking plan may be a simple floor plan or top-down plan of the building showing each space. All spaces are sized proportionately based upon their actual square footage and the physical relationships between spaces are shown.

At the bottom of the Stacking Plan screen 1300 (FIG. 13) may be a vertical bar chart 1314, generated by the a bar chart generator that retrieves data from the System 10 database 12, showing the monthly occupancy for the preceding and following twelve months from the user selected date in the target date box 1308. This bar chart 1314 is then overlaid by a line graph 1316 from a line graph processor 72 that shows the average net rent per rentable square foot during each of those months.

Changing a target date in the target date box 1308 followed by a click of the Refresh button produces a new stacking plan that will update the expiration period colors for each space and will show which suites are vacant at that point (i.e., date) in the future. If a date in the past is chosen and the suite sizes were different, then the stacking plan shows those changes as well. The stacking plan provides a convenient and simple way to visualize the leasing status at any period a user may choose.

The ability to solve for and provide time/performance information is unique to the system 10. Such questions arise in the context of "how are we doing now compared to when we bought the building". Users can see the building condition in the past and just as quickly view the condition in the future to answer the question "how are we going to be doing then".

For example, if an inquiry is received from a prospective tenant seeking space for a future occupancy, the user inputs that date in the target date box 1308 and the way-finding-stacking-plan displays the future building condition (occupancy) allowing the user to take the tenant on an abbreviated virtual tour of the spaces that will be available to meet their future occupancy needs. The user will also see the average net rent per rentable square foot and occupancy for the building as of that future date and can adjust the business terms accordingly for any lease proposal generated as a result of the inquiry. After a particular building space believed to be of interest to the prospect is identified, the user clicks on the rental space to view a drop down menu that may allow the user to view a lease abstract, view any document or image associated to that space, or generate a lease proposal.

Figure 14:
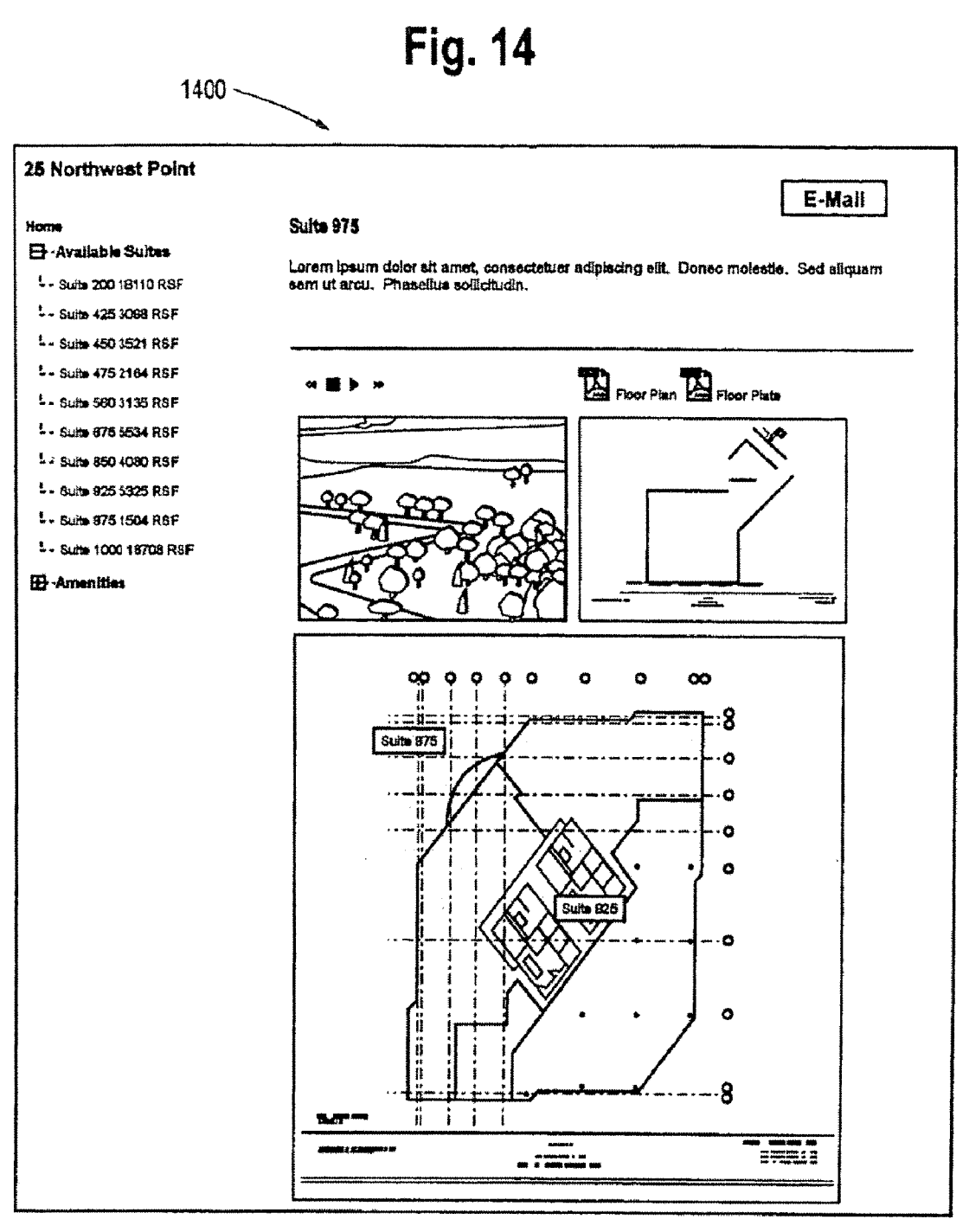

The user may click on any rental space displayed in the Stacking Plan screen 1300 (FIG. 13) to reveal a drop down menu whereby the user may view a lease abstract, view suite information (including all photos and documents associated with the rental space), or generate a lease proposal for e-mailing to a tenant prospect. At the top of the Stacking Plan screen 1300 (FIG. 13) above the stacking plan 1302 is a softkey 1318 that activates a generate webpage wizard in a similar manner as described below with respect to the Suite Information screen 1500 (FIG. 15) wherein the user may create a customized Web Page 1400 (FIG. 14) for a specific tenant prospect containing building and rental space information and associated photos, floor plans and documents selected by the user.

The user may select a first option from the drop down menu to open a Suite Information screen 1500 (FIG. 15) that identifies suite specifications 1502, including name, type, size, asking rental rate and a description in the upper left corner. In the middle section 1504 of the Suite Information screen 1500 (FIG. 15) the user may access all floor plans, photos and documents associated with the rental space. In addition, the user may create, edit or review a description of any amenities, lease options or notes associated with the rental space.

At the bottom of the Suite Information screen 1500 (FIG. 15) is a softkey 1506 that activates a generate web page wizard wherein the user may create a customized web page targeted for a specific tenant prospect containing building and rental space information and associated photos, floor plans and documents selected by the user.

Figure 15:
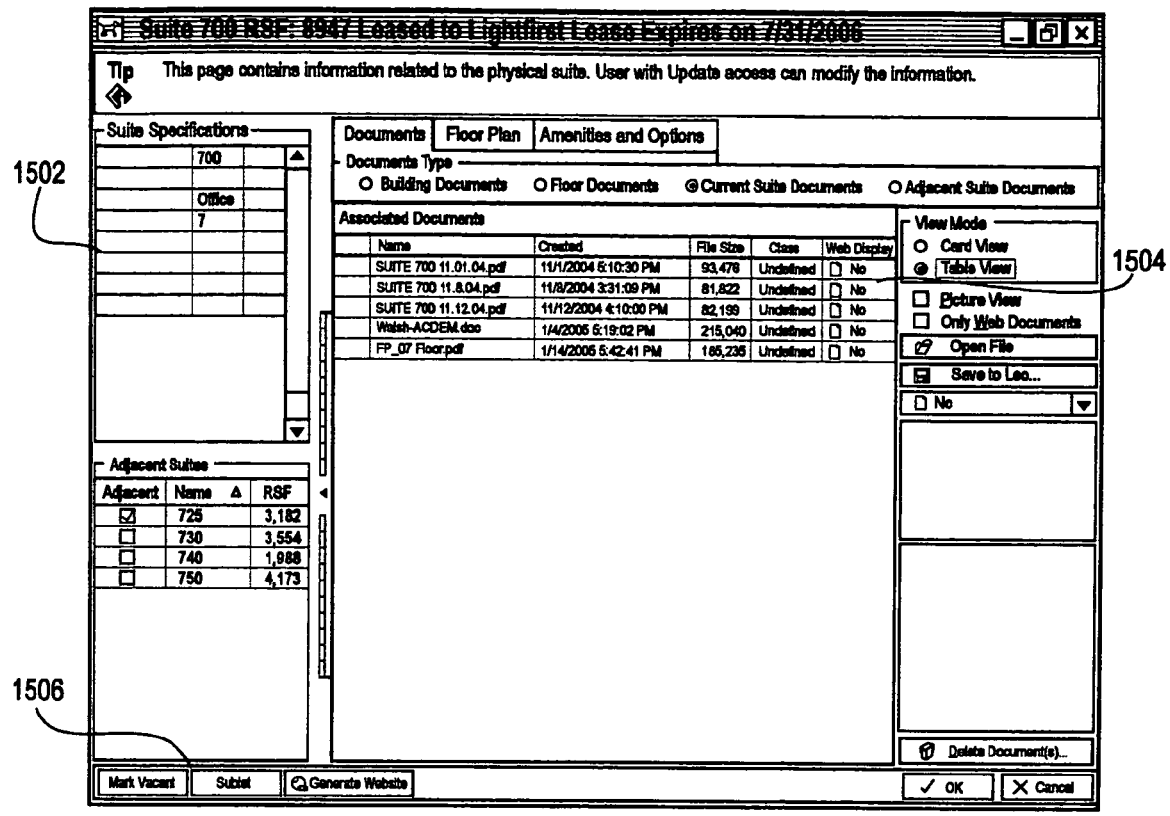
FIG. 15 is a Suite Information screen with a web site generator wizard that may be used by the system of FIG. 1.

The web page generator may be used as a marketing tool for potential tenants. The user may select the suites and floors to be included on the web page and then select a web template provided by the system 10. The user may select files to appear on the web page from the files associated to the rental space on the Suite Information screen 1500 (FIG. 15). The web site generator uses the information provided about the building and the rental space to quickly build a web page describing amenities and providing details about the property and the suite, including user selected photographs, floor plans and documents. After the user reviews and approves the web site the system 10 may activate an e-mail application pre-populated with a web address of the created web site 62. The user may enter an e-mail address of a prospective tenant. The system 10 may capture this information and e-mail the web site 62 URL to the prospective tenant and the prospective tenant only.

The user may also want to prepare an introductory letter or lease proposal to be directed to a prospective tenant, with or without a user generated web page. To do this, the user may activate the proposal generator wizard by selecting the proposal generator option from the drop down menu that may be displayed by clicking on any space identified on the Stacking Plan screen 1300 (FIG. 13). The user may select from a proposal template provided by the system 10, create their own template in Rich Text Format, or select a document associated with a building or rental space and use that document to build the proposal letter. After selecting a template file the user may complete the fields on the screen that appears to fill out the proposal letter. After the user reviews and approves the proposal the system 10 activates an e-mail application pre-populated with a web address of the created web site 62. User approved proposal letters may be automatically associated to the rental space for future reference at the Suite Information screen 1500 (FIG. 15).

Figure 16:
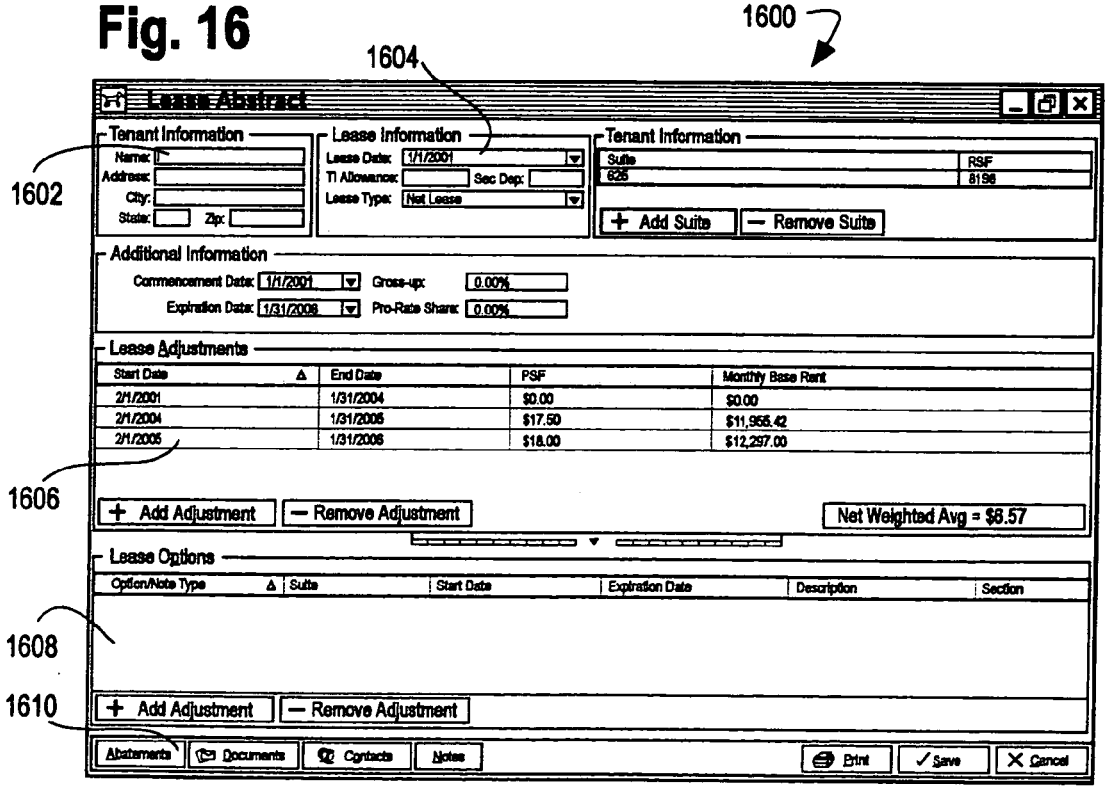
FIG. 16 is a Lease Abstract window that may be used by the system of FIG. 1.

By selecting the view lease abstract option from the drop down menu that may be displayed by clicking on any space identified on the Stacking Plan screen 1300 (FIG. 13) the user may open the Lease Abstract window 1600 (FIG. 16) where tenant information 1602, lease information 1604, lease adjustments 1606 and lease options 1608 and may be easily entered, reviewed, printed or included in a monthly report. Using the softkeys 1610 located at the bottom of the Lease Abstract window 1600 (FIG. 16) the user may also view any rent abatement information, notes, documents and contacts associated with that lease.

The lease abstract data, when completed, causes the stacking plan to be automatically updated. As new leases are signed after the initial data entry effort, the user may quickly and easily update the stacking plan and building data by completing the lease abstract form. The same form may be used to enter tenant option data, which allows the system 10 to provide the owner/manager with date alerts that appear on the What's New screen 2000 FIG. 20 of the system 10. For example the system 10 may advise the user that a certain tenant lease termination option is scheduled to expire in the next 30 days. Or the system 10 may warn a user that a newly generated lease proposal violates certain option rights contained in an existing lease. For example, the system 10 may provide a warning to the user when the user attempts to create a lease proposal for space that is encumbered with an expansion right or the right of first refusal of an existing tenant.

Figure 17:
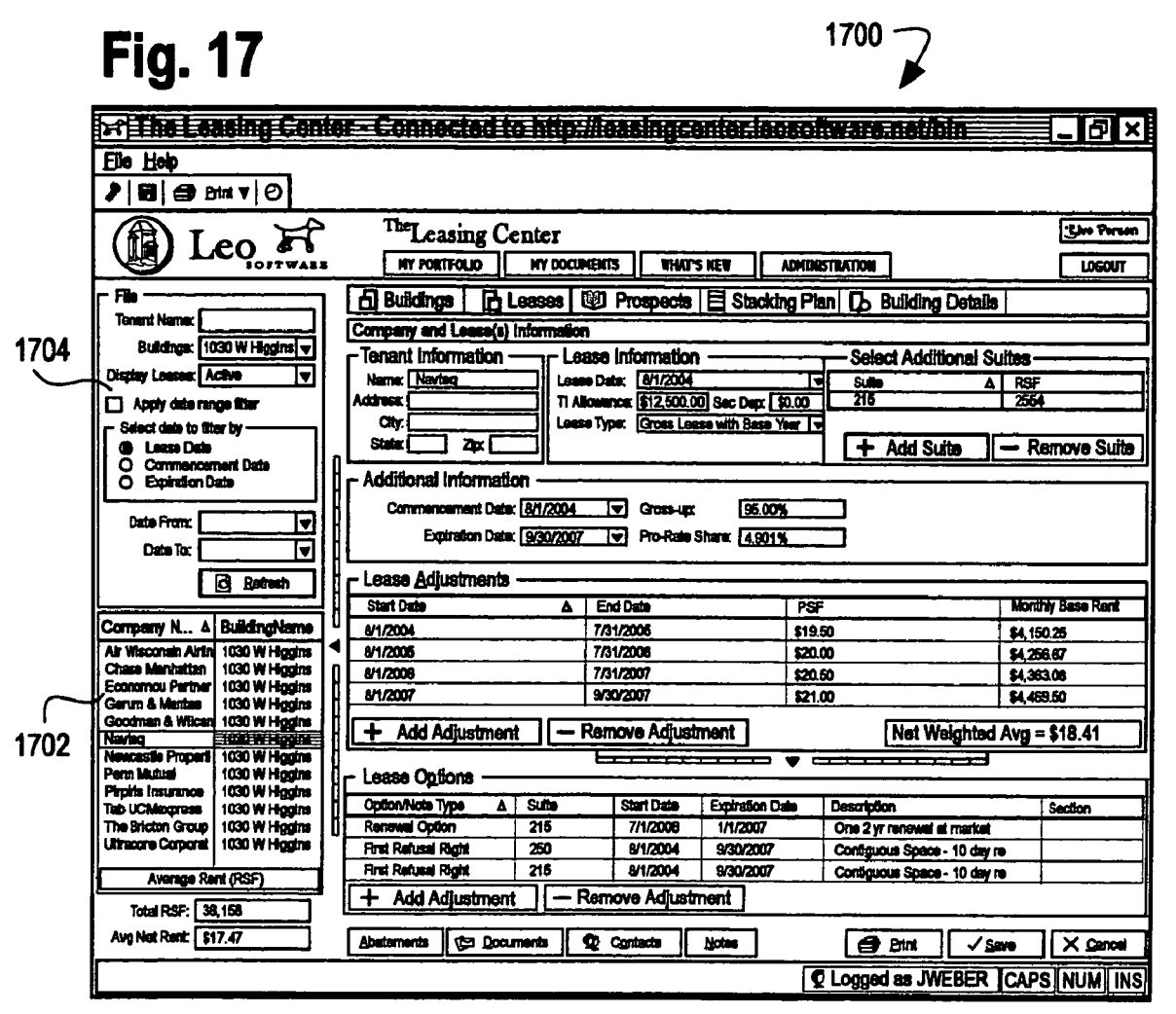

To view or create an abstract of a lease associated to a rental space the owner/manager may activate the Leases screen 1700 (FIG. 17) by clicking on the Leases softkey 918 of the Buildings screen 900 (FIG. 9) (The Buildings 922, Leases 918, Prospects 920, Stacking Plan 916 and Building Details 914 softkeys may be found on every screen contained within the My Portfolio section of the system 10). Using the Leases screen 1700 (FIG. 17) the user may find, create, edit and manage rental space leases.

The right side of the Leases screen 1700 (FIG. 17) contains the Lease Abstract window 1600 (FIG. 16) where lease data may be easily entered, reviewed, edited, printed or included in a monthly report, as discussed above. Using the softkeys 1610 located at the bottom of the Lease Abstract window 1600 (FIG. 16) the user may also view any rent abatement information, notes, documents and contacts associated with that lease.

The left side 1702 of the Lease Manager screen 1700 (FIG. 17) lists the leases of each of the buildings in the system 10 or the user may use the filtering section 1704 to find leases for any selected portfolio, building or tenant within the system. Through the Leases screen 1700 (FIG. 17), the user may easily view, edit and print each of the individual lease abstracts previously created within the Stacking Plan area 1300 (FIG. 13) of the system 10.

Figure 18:
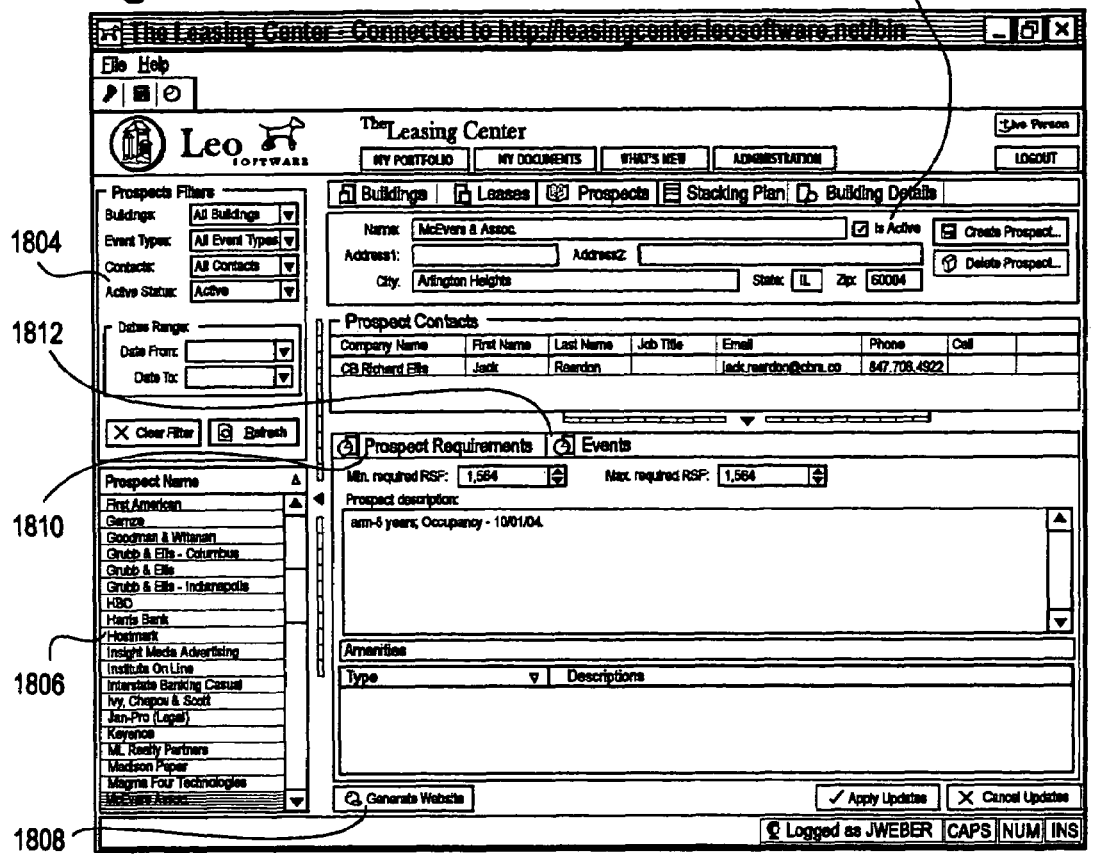
FIG. 18 is a Prospects screen that may be used by the system of FIG. 1.

The user may activate the Prospects softkey 920 of the Buildings screen 900 (FIG. 9) to display the Prospects screen 1800 (FIG. 18). Using the Prospects screen 1800 (FIG. 18) the user may enter, edit and manage activities related to a rental space. Any time a user has a contact or completes an activity the user may create a record of that activity by inputting data into the contact record section 1802 of the Prospects screen 1800 (FIG. 18), which record may include the prospect's name, address, contact, event activity and prospect requirements.

The left side of the Prospects screen 1800 (FIG. 18) contains a prospect record filter box 1804 that allows the user to search the system 10 database 12 for contact records based on building name, event type, contact name, status and date. The search results are shown in the bottom left corner 1806 of the Prospects screen 1800 (FIG. 18). By clicking on a prospect name the user may retrieve, review, amend or update all previous contact records for that prospect or create a new record that the system 10 will automatically associate with that prospect.

A Generate Website softkey 1808 located at the bottom of the Prospect screen 1800 (FIG. 18) opens the web site generator, previously described in the Suite Information screen 1500 (FIG. 15).

The Prospect Requirements softkey 1810 and the Events softkey 1812, located in the middle of the Prospects screen 1800 (FIG. 18) may allow the user to input information about the prospect's rental space requirements or create a detailed record of each activity or event relative to that prospect.

Figure 19:
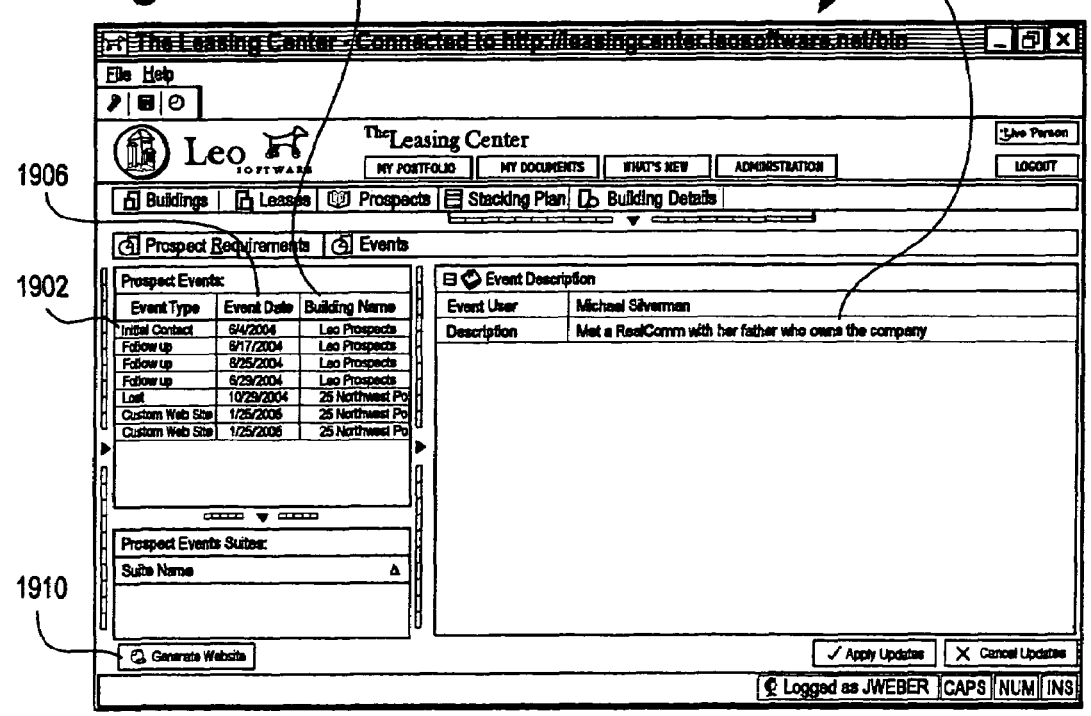
FIG. 19 is an Events window that may be used by the system of FIG. 1.

The Events softkey 1812 opens the Events window 1900 (FIG. 19) where the user may select an event type 1902, associate the event to a building 1904 and input the date 1906 and a description 1908 of the event. Any web sites or lease proposals generated by the system 10 are automatically associated to that prospect's contact record. The user may define the event type 1902 as follow-up and the system will automatically notify the user of the follow-up date on the What's New screen 2000 FIG. 20. The user may activate the Generate Website softkey 1910 to access the web page generator wizard previously described in the Suite Information screen 1500 (FIG. 15) and create a customized web page targeted for a specific prospect.

The What's New section (FIG. 20) of the system 10 may present the user with a list of past, present and future events which the user may filter by property 2004, date 2002, event type 2008 and subject entity 2006. These events are typically either (i) lease driven events such as when a tenant's option to terminate begins and ends, when a tenant's lease expires or the expiration of a tenant's option to renew their lease, or (ii) tenant prospect events such as prospect contact, premises showing, issuance of a letter of intent, customized web site creation or lease execution. The What's New screen 2000 (FIG. 20) includes event descriptions 2010 for the listed events, and a Send Mail softkey 2012.

Figure 20:
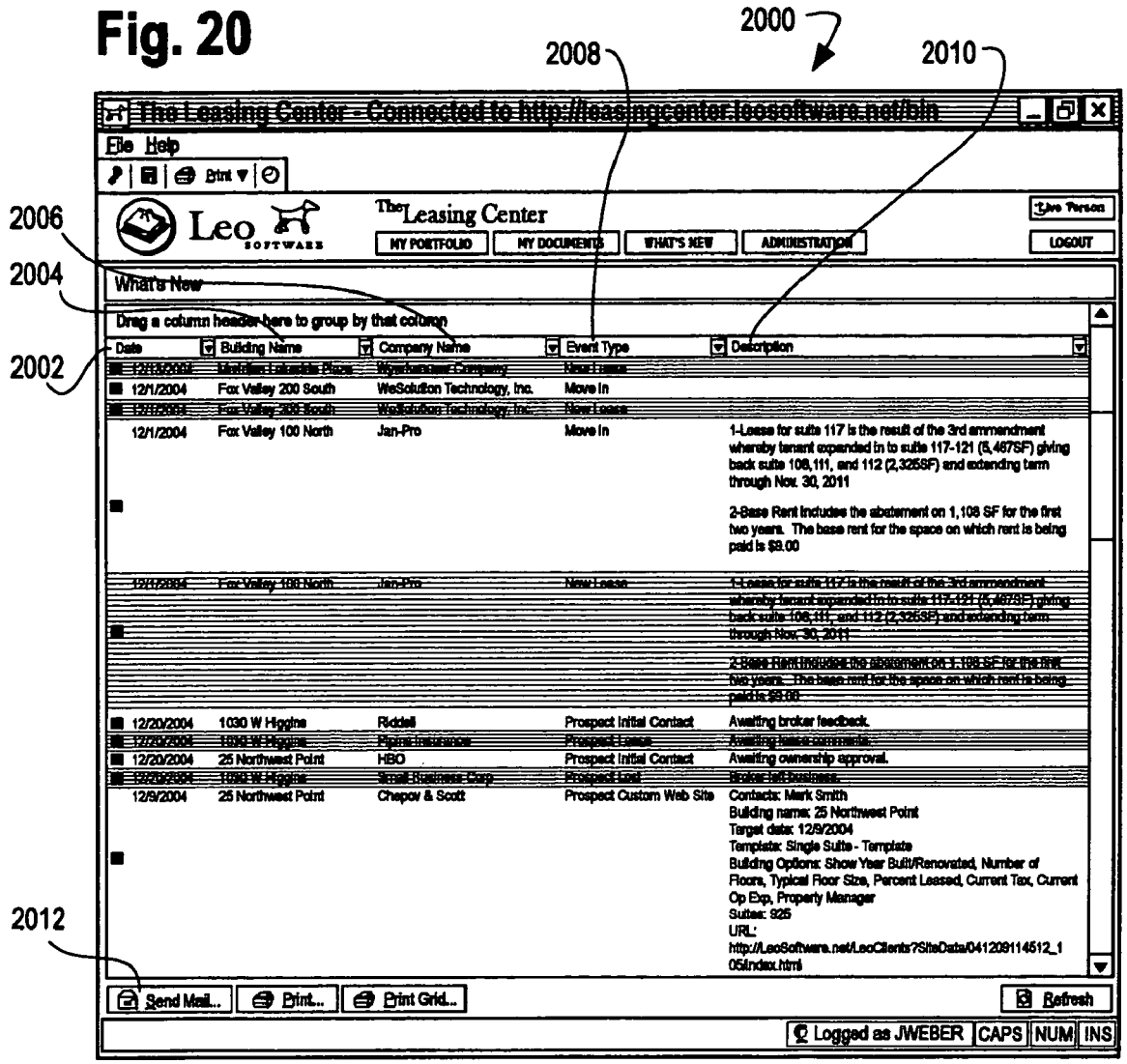
FIG. 20 is a What's New screen that may be used by the system of FIG. 1.

Activation of the What's New softkey 306 in the Home Page screen 300 (FIG. 3) may take a user to the What's New screen 2000 (FIG. 20). Within the What's New screen 2000 (FIG. 20), the user may view contact records based on building name, event type, company name and date. For example a building owner/manager may monitor leasing broker activity by Turning now to the system 10 in specific, a number of examples will be offered regarding the use of the system 10. In a first example, the system 10 uses the search engine 60 that allows for multi-variable searches of a plurality of key real estate features.

With regard to the search engine 60, a tenant's lease search and decision to lease is determined by a multitude of factors including rent, operating expenses, tenant improvement allowance, location, amenities, layout, parking, signage and image. In order to succeed in an increasingly competitive leasing market, real estate professionals need fast, accurate, comprehensive knowledge of their portfolios. A search of the user's portfolio within the system 10 focused on a prospective tenant's critical needs quickly identifies those buildings most likely to appeal to that tenant. The agent 28, 30 then maximizes their likelihood of success by preparing a targeted proposal highlighting their building's unique ability to satisfy that particular tenant's needs.

As a more specific example, broker Bob receives a phone call at home at 9:00 a.m. on Saturday morning, Mar. 27, 2004, from Tenant XYZ. XYZ needs 20,000 rsf of space in Naperville, Ill. Because XYZ provides fleet location information to their trucking clients using global positioning technology they require high speed internet access, a back-up electrical generator, 24 hour building access, an on-site deli and covered parking. Bob brings up the system 10 on his home computer, clicks on the Buildings softkey displaying a list and "Snap-Shots" of all the buildings he represents. (Each Snap-Shot contains a photo and vital building statistics including address, size, occupancy, average rent, current taxes and operating expenses, etc.). Bob clicks on the filter box key contained at the top of the Buildings page opening a window containing a template of multiple search categories. Bob enters Naperville in the Sub Market box, 20,000 in the Suite RSF box, in the Building Amenities drop down menu clicks yes for high-speed internet access, clicks yes for electrical generator, etc. Bob clicks the search button and the system 10 displays a "Snap-Shot" of the Naperville AAA Building, the only building that Bob represents that meets XYZ's needs.

In another example, the system 10 generates a graphic representation of a building, the location, the relative size and lease status of each demised premises contained within that building (single or multiple story) as of a user identified date (the "stacking plan"). The generated stacking plan of the system 10 may also contain a unique menu of icons representing critical lease terms (e.g. renewal option, expansion option, termination option, right of first refusal, etc.)

In this regard, the real estate professional uses stacking plans to monitor the leasing status and available space within their buildings at any point in time. Typically, stacking plans are architect prepared static drawings that become obsolete with each subsequent lease transaction. By allowing the user to control the time line, the system 10 converts the stacking plan from a static monitoring tool to a dynamic projection device and eliminates the architect's fees.

As a more specific example, XYZ is excited about the Naperville AAA Building and tells Bob they need the space beginning Nov. 1, 2004. Bob highlights the Naperville AAA Building Snap-Shot, clicks the stacking plan button, enters the projected commencement date and views a window that displays a stacking plan as of Nov. 1, 2004. The stacking plan shows availability of 25,000 rsf as of Nov. 1, 2004. Unfortunately, XYZ needs all of its employees on a single floor and the available space is not contiguous, 15,000 rsf (Ste. 900) is located on the $9^{th}$ floor and 10,000 rsf (Ste. 1000) is located on the $10^{th}$ floor. However, the system generated stacking plan also displays an icon in Suite 950 indicating Landlord's right to relocate Tenant ABC from their current 7,500 rsf premises located adjacent to the Suite 900.

The system 10 uses the stacking plan as an interface for accessing all data base information associated with the building and each of the demised premises. To make an informed business decision, the real estate professional must refer to multiple lines of information obtained from multiple sources. The system 10 enhances the value of the stacking plan exponentially by allowing the user to navigate directly to the relevant information associated with the subject building or space.

As another more specific example, Broker Bob clicks on Suite 950 in the stacking plan displaying a drop down menu of options, including view suite and view lease abstract. Bob selects view lease abstract and determines from the options section of the abstract that ABC's lease contains a relocation clause on page 12 of the lease. Bob then selects view suite, opening a window containing a table of all documents associated with Suite 950, including a copy of ABC's signed lease. Bob opens the lease file, scrolls down to page 12 and reviews the relocation section that grants Landlord the right to relocate ABC provided the replacement space is similar in size, configuration and has similar window line views. Bob has never been inside Suite 950 as the ABC lease pre-dates Bob's acquisition of the Naperville AAA Building leasing assignment. From the table of associated documents Bob opens a space plan file and various interior photos to familiarize himself with the configuration and window line views from Suite 950. Returning to the stacking plan, Bob clicks on Suite 1000 and determines from his review of a space plan and interior photos contained in the associated documents table that the relocation of ABC to the $10^{th}$ floor will not violate the terms of the lease. Bob tells XYZ he can accommodate their needs in the Naperville AAA Building and will issue a lease proposal after he talks with the building Owner.

Using the system 10, Documents critical to the transaction process are available for simultaneous viewing by multiple real estate professionals in multiple locations, facilitating real estate transactions by creating a collaborative environment. In this regard, real estate transactions typically require input from multiple real estate professionals including owners, brokers, managers, architects, contractors, lenders and attorneys. The system 10 eliminates the inefficiency and the potential for error created when multiple versions of documents are circulated to various parties for review and input.

As another specific example, Bob calls Building Owner Owen at home. Owen is very excited about the prospect of a new 20,000 rsf tenant, but he is not thrilled about the additional cost of relocating ABC. Owen and Bob each navigate to the Building Manager screen, create stacking plans, navigate to the associated documents table for Suite 1000 and open the space plan to discuss the ABC relocation. Owen prefers locating ABC in the north 7,500 rsf of Suite 1000 as that space more closely resembles ABC's current Suite 950 open layout. Bob comments that locating ABC in the north end will leave a balance of 2,500 rsf that will be extremely hard to lease because of its awkward configuration. To illustrate his point, Bob uses the single floor stacking plan generator of the system 10 to create alternative hypothetical floor plans. Owen and Bob agree that the only sensible course of action is to relocate ABC in the south 7,500 rsf of Suite 1000. Bob calls Collins Construction at home to obtain a rough estimate of the cost to construct ABC's relocation space. Collins pulls up the system 10 on his home computer, navigates via the stacking plan to the current condition drawings for Suite 1000, determines ABC's proposed location within Suite 1000 by referring to the hypothetical floor plan generated by Bob, reviews the current layout and the construction cost records for Suite 950 and provides Owen and Bob a rough cost estimate of $75,000 to reconstruct ABC's current layout in the south 7,500 rsf of Suite 1000.

The system 10 may be used to generate individualized web pages of the website 62 directed towards specific prospective tenants incorporating various real estate data points and resident data base files as selected by the user within the system.

As another example, the opening gambit in the real estate transaction process is the letter of intent. The letter of intent is a combination business term sheet and marketing piece. A prospective tenant typically visits multiple properties and receives multiple letters of intent. A letter of intent should differentiate the subject premises from its competitors on a basis of cost, location, amenities, etc. The system 10's web page generator gives the user a market advantage by creating an interactive targeted web page 62 that contains photos, floor plans, space plans, maps, as well as, the proposed business terms. The personalized web page refreshes the prospective tenant's memory of the premises and the building amenities, gives the decision makers a user controlled view of the premises and differentiates the user from all those other impersonal, word processing form generated letters of intent.

As another example, Owen directs Bob to issue a letter of intent to XYZ offering a five year lease term with an initial net rental rate equal to the current average net rental rate in the building. The building standard tenant improvement allowance of $30.00/rsf is to be reduced by the cost to relocate ABC. Bob clicks on the Generate Web Page button located at the bottom of the suite information window of the stacking plan opening a window containing a web page wizard. Using the web page wizard checkbox menu Bob directs the system 10 to include in the web page selected building information drawn from the database 12 including address, building size, parking ratio, system 10 generated current average net rental rate information, operating cost and real estate tax cost information, etc. From the amenities drop down menu he selects covered parking, high-speed internet access, back-up electrical generator, 24 hour building access and on-site deli. Navigating through the database 12 with the stacking plan interface to the suite information window Bob clicks on various documents associated with Suite 950 for inclusion in the web page, including a floor plan of the 9$^{th}$ floor, photographs of the interiors of Suites 900 and 950, photographs of the exterior of the building and photographs of key building amenities including the deli, parking garage and security desk. Finally, Bob enters a tenant improvement allowance number into the template. Clicking on the preview web page button, Bob proofs the layout, replaces one of the interior shots with a springtime view of the Fox River as seen from Suite 900 and clicks the create web page button. A draft e-mail window opens directing the recipient to the personalized web page via a hot-link. Bob addresses the e-mail to XYZ with a copy to Owen and hits send.

Its 10:00 a.m. and Bob decides to treat himself to breakfast at Walker's Pancake House. He can afford it. If XYZ leases the 20,000 SF at the Naperville AAA Building Bob will earn a commission of $100,000.

The system 10 may be used to generate leasing reports that track multiple real estate data points across user selected portfolios and timeframes. In this regard, the lease process from letter of intent to occupancy typically covers between 4-12 months. Building owners and asset managers rely on their brokers for leasing activity and status information. Brokers are compensated for leasing, not reporting and most do not report well or often. The system 10 stores the key business terms contained in each letter of intent allowing the user to track leasing trends over time and space.

As a specific example, Supervisor Sam, Bob's Managing Broker, uses the system 10 to track the effectiveness of each of his brokers. Sam clicks on the display filter box softkey contained at the top of the Buildings page opening the search template. Sam enters Broker Bob in the broker box, clicks the search button and the system 10 displays a "Snap-Shot" of every building Bob represents. Sam clicks the portfolio summary button displaying key data points including rentable space, leased space, average net rent, last deal net rent and percent leased. Setting the query date back 6 months Sam compares the current portfolio percent leased of 85% and average net rent of $12.75/rsf to the Sep. 27, 2003 percent leased of 73% and average net rent of $12.00/rsf. Sam is pleased. On a whim, Sam queries the system 10 and discovers that 26.72% of Bob's system generated letters of intent ultimately go to lease. That seems to be an extraordinarily high success rate. Sam decides to compare Bob's success rate before the start-up of the system 10 with his post start-up success rate. After an hour of searching through old spreadsheets Sam gives up. Without the system 10 it is too hard to track the information.

In another illustrated embodiment, the system 10 may be maintained as a stand-alone processing system maintained by third-party service providers and accessed by owner/managers through a remotely located computer system 22, 24. In this manner, the owner/manager may access the system 10 through the Internet 26 and set up an account using a password. Once an account has been set up, the owner/manager may establish a set of building files 36, 38, 40 within the database 12 substantially as discussed above through the website 62.

Once the building files 36, 38, 40 have been established, the building files 36, 38, 40 may be automatically maintained in an up-to-date state via a connection utility (e.g., program) 74 located within a terminal 24 of the property owner/managers. In general, the connection utility 74 may be a separate web service application that runs on the owner/manager computer 24 and that replicates data from any data source of the owner/manager into the remotely located system database 12. Replication can be scheduled to occur periodically with no owner/manager interaction or may be initiated by the owner/manager manually. In this regard, replication is always one-way (read only)—from the owner/manager terminal 24 to the system 10. Data from the owner/manager terminal 24 takes precedence over data stored within the system 10 if a conflict occurs.

In order to perform replication, the connection utility 74 sets up connections with one or more data sources 76 used within the owner/manager system 24 (e.g., Yardi, Skyline, Timberline, Pervasive DB, MS DB, DB, etc.). The utility 74 may use Data Abstract schema to connect to different sources seamlessly (e.g., a DA ADO driver for MS, SQL, Yardi, a DA PDAC driver for Pervasive DB, Skyline, etc.). The utility 74 allows an owner/manager to configure multiple connections with different data sources 76 and for every connection, the utility 74 allows the owner/manager to configure a replication schedule, list of buildings to replicate and additional connection properties, if any.

In this regard, the connection utility 74 builds a snapshot of data from the owner/manager database 76 and sends this data to the system database 12. The snapshot is build using a set of SQL queries and transformation scripts used to map data from the owner/manager database into a set of fields required for replication. Updated SQL queries and transformation data may be periodically downloaded from a connector server 78 within the system 10.

The connection server 78 logs all requests received through the connection from the utility 74. In order to eliminate duplicates, the server 78 may check if the request differs from the last request and imports only fields that have changed. The server 78 may then merge data received from the utility 74 into the database 12 within the file structure created for that particular owner/manager 24.

In order to perform a replication, the utility 74 may first read a local configuration file for the database 12. The utility 74 may then log into a server 78 of the system 10 using userid/password(s) and a URL configured by the owner/manager. The utility 74 may connect to the system 10 via HTTP and support authentication through proxies/firewalls of the system 10 that require authentication using conventional methods.

Once logged into the server 78, the utility 74 may download a list of owner/manager connection items and a format of each connection item. For each connection item, the utility may check for updated queries and scripts and download any updates, if available. In general, each query is may be designed for a certain entity type (e.g., building, suite, lease, etc.).

The downloaded connection items may form a list of primary entities (buildings information files) to replicate. The utility 74 may create a snapshot out of owner/manager data using the snapshot format, send the snapshots to the server 78 and log out.

The snapshot format used by the utility 74 and server 78 may be in a human-readable XML format that simplifies logging requests into the database 12, comparing any two subsequent requests for changes and de-bugging. To maximize flexibility, a simple snapshot format to replicate buildings with suites and leases may have the format as follows.

```
<snapshot>
    <Buildings>
        <Building>
            <Suites>
                <Suite>
                </Suite>
            </Suites>
            <Leases>
                <Lease>
                    <LeaseSuites>
                        <LeaseSuite>
                            <LeaseEscalations>
                                <LeaseEscalation>
                                </LeaseEscalation>
                            </LeaseEscalations>
```

-continued

```
                            <LeaseAbatements>
                                <LeaseAbatement>
                                </LeaseAbatement>
                            </LeaseAbatements>
                        </LeaseSuite>
                        <LeaseOptions>
                            <LeaseOption>
                            </LeaseOption>
                        </LeaseOptions>
                    </LeaseSuites>
                </Lease>
            </Leases>
        </Building>
    </Buildings>
</snapshot>
```

Similar to the Queries approach, there may be default snapshot formats for each connection type (e.g., Yardi, Skyline, etc.) and custom snapshot formats for special connections.

In order to create a data snapshot, the utility 74 may use the list of connections for the primary entities and format that were downloaded from the server 78 of the database 12 to identify a snapshot XML tree for each format. The utility 74 may then traverse the snapshot format's XML tree and execute a series of steps at each node.

As a first step, the utility 74 may create appropriate sub-nodes in a resulting snapshot XML. The utility 74 may then check if an appropriate query exists with an entity type matching the node name. If a query exists, it will be executed using parent node values or entity map values for any parameters of the query. A dataset of the query may be saved to the XML snapshot using an XML adapter and for every record of the query new XML sub-nodes may be created.

The process may continue for each sub-node using snapshot format sub-nodes. When each sub-node has been processed, the complete XML snapshot may be created. The relations between one-letter entity types and node names may be stored in a special database table, EntityTypes.

A specific embodiment of a system for presenting leasing arrangements has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of presenting information pertaining to a plurality of distinct spaces within a building, comprising:
    storing information for each of the plurality of distinct spaces for the building, wherein information for multiple buildings may be stored;
    prompting a user to select a building for display of stored information for the distinct spaces of the building;
    receiving input from the user selecting the building for display of stored information for the distinct spaces; and
    graphically displaying stored information for the distinct spaces of the selected building in response to the input selection received from the user, wherein the graphical display of the stored information is at least one selected from the group consisting of:
- a) a two-dimensional display of the stored information for the distinct spaces of the selected building, wherein the stored information for each distinct space includes a physical size of the distinct space and a relative location of the distinct space within the building, and wherein each distinct space is represented on the two-dimensional display by a corresponding space identifier having a size proportional to the stored physical size of the distinct space and a relative location within the two-dimensional display corresponding to the stored relative location of the distinct space within the building, and
- b) a display of the stored information for the distinct spaces of the selected building, wherein the stored information for at least some of the distinct spaces includes lease information for the distinct space, wherein a lease status for a distinct space is determined based on the stored lease information for the distinct space, and wherein each distinct space having lease information is represented on the display by a corresponding space identifier having a graphical representation of the lease status of the distinct space.

2. The method of presenting information pertaining to a plurality of distinct spaces within a building as in claim 1, wherein at least the two-dimensional display is graphically displayed, and wherein the space identifier for each distinct space is rectangular with an area of the rectangle being proportional to the stored physical size of the distinct space.

3. The method of presenting information pertaining to a plurality of distinct spaces within a building as in claim 1, wherein at least the two-dimensional display is graphically displayed, and wherein the stored relative location of each distinct space includes the floor of the building on which the distinct space is located, and wherein the two-dimensional display is configured such that the space identifiers for distinct spaces on higher floors are displayed above the space identifiers for distinct spaces on lower floors.

4. The method of presenting information pertaining to a plurality of distinct spaces within a building as in claim 1, wherein at least the lease status for each distinct space having stored lease information is graphically displayed, and wherein the graphical representation of the lease status of a distinct space is the display of a color of the space identifier corresponding to the time remaining until the expiration of the lease for the distinct space.

5. The method of presenting information pertaining to a plurality of distinct spaces within a building as in claim 1, wherein at least the lease status for a distinct space having stored lease information is graphically displayed, and wherein the graphical representation of the lease status of a distinct space is a predetermined vacancy color when the stored lease information for the distinct space indicates that the distinct space is vacant.

6. The method of presenting information pertaining to a plurality of distinct spaces within a building as in claim 1, comprising:
    providing a prompt for a target date for the stored information to be displayed;
    receiving input from the user selecting the target date for the information to be displayed; and
    graphically displaying stored information for the distinct spaces of the selected building for the selected target date, wherein the two-dimensional display reflects the relative sizes and relative locations of the distinct spaces on the selected target date, and wherein the lease status for each distinct space having stored lease information is determined for the selected target date.

7. The method of presenting information pertaining to a plurality of distinct spaces within a building as in claim 1, wherein graphically displaying stored information for the distinct spaces of the selected building comprises:
    storing occupancy information for each distinct space;
    retrieving the stored occupancy information for each of the distinct spaces of the selected building for a predetermined range of time; and
    generating and displaying a chart indicating the occupancy of the selected building over the predetermined range of time.

8. The method of presenting information pertaining to a plurality of distinct spaces within a building as in claim 1, wherein graphically displaying stored information for the distinct spaces of the selected building comprises:
    storing information regarding income generated for distinct spaces;
    retrieving the stored income information for the distinct spaces of the selected building for a predetermined range of time and calculating an average income per square foot for the selected building; and
    generating and displaying a graph indicating the average income per square foot for the selected building over the predetermined range of time.

9. The method of presenting information pertaining to a plurality of distinct spaces within a building as in claim 1, comprising:
    detecting the position of a cursor at one of the space indicators;
    retrieving additional stored information for the distinct space corresponding to the space indicator at which the cursor is detected; and
    generating and displaying a window with the retrieved additional stored information for the distinct space at the position of the cursor.

10. The method of presenting information pertaining to a plurality of distinct spaces within a building as in claim 9, wherein the displayed window includes a drop down menu with a list of functions related to the distinct space that may be selected by the user for execution.

11. The method of presenting information pertaining to a plurality of distinct spaces within a building as in claim 1, wherein at lease some of the distinct spaces within a building are rental spaces.

12. An apparatus for presenting information pertaining to a plurality of distinct spaces within a building for a plurality of distinct spaces of a building, comprising:
    an input device;
    a database storing information for each of the plurality of distinct spaces for the building, wherein information for multiple buildings may be stored in the database;
    a display device; and
    a host device operatively connected to the input device, the database and the display device,
        the host device being programmed to cause the display device to display a prompt for a user to select a building for display of stored information for the distinct spaces of the building,
        the host device being programmed to receive input from the user at the input device selecting the building for display of stored information for the distinct spaces, and
        the host device being programmed to retrieve stored information for the distinct spaces of the selected building from the database in response to the input selection received from the user, and to cause the display device to display a graphical display of the retrieved information, wherein the graphical display of the stored information is at least one selected from the group consisting of:

a) a two-dimensional display of the stored information for the distinct spaces of the selected building, wherein the information stored in the database for each distinct space includes a physical size of the distinct space and a relative location of the distinct space within the building, and wherein each distinct space is represented on the two-dimensional display by a corresponding space identifier having a size proportional to the stored physical size of the distinct space and a relative location within the two-dimensional display corresponding to the stored relative location of the distinct space within the building, and b) a display of the stored information for the distinct spaces of the selected building, wherein the information stored in the database for at least some of the distinct spaces includes lease information for the distinct space, wherein the host device is programmed to determine a lease status for a distinct space based on the stored lease information for the distinct space, and wherein each distinct space having stored lease information is represented on the display by a corresponding space identifier having a graphical representation of the lease status of the distinct space.

13. The apparatus for presenting information pertaining to a plurality of distinct spaces within a building as in claim 12, wherein at least the two-dimensional display is graphically displayed, and wherein the space identifier for each distinct space is rectangular with an area of the rectangle being proportional to the stored physical size of the distinct space.

14. The apparatus for presenting information pertaining to a plurality of distinct spaces within a building as in claim 12, wherein at least the two-dimensional display is graphically displayed, and wherein the stored relative location of each distinct space includes the floor of the building on which the distinct space is located, and wherein the two-dimensional display is configured such that the space identifiers for distinct spaces on higher floors are displayed above the space identifiers for distinct spaces on lower floors.

15. The apparatus for presenting information pertaining to a plurality of distinct spaces within a building as in claim 12, wherein at least the lease status for each distinct space having stored lease information is graphically displayed, and wherein the graphical representation of the lease status of a distinct space is the display of a color of the space identifier corresponding to the time remaining until the expiration of the lease for the distinct space.

16. The apparatus for presenting information pertaining to a plurality of distinct spaces within a building as in claim 12, wherein at least the lease status for each distinct space having stored lease information is graphically displayed, and wherein the graphical representation of the lease status of a distinct space is a predetermined vacancy color when the stored lease information for the distinct space indicates that the distinct space is vacant.

17. The apparatus for presenting information pertaining to a plurality of distinct spaces within a building as in claim 12, wherein the host device is programmed to cause the display device to display a prompt for a target date for the stored information to be displayed;

wherein the host device is programmed to receive input from the user at the input device selecting the target date for the information to be displayed; and wherein the host device is programmed to retrieve stored information for the distinct spaces of the selected building for the selected target date from the database in response to the input target date received from the user, and to cause the display device to display a graphical display of the retrieved information, wherein the two-dimensional display reflects the relative sizes and relative locations of the distinct spaces on the selected target date, and wherein the host device is programmed to determine the lease status for each distinct space having stored lease information for the selected target date.

18. The apparatus for presenting information pertaining to a plurality of distinct spaces within a building as in claim 12, wherein the database stores occupancy information for each distinct space;

wherein the host device is programmed to retrieve the stored occupancy information for each of the distinct spaces of the selected building for a predetermined range of time from the database; and wherein the host device is programmed to generate a chart indicating the occupancy of the selected building over the predetermined range of time and to cause the display device to display the generated chart.

19. The apparatus for presenting information pertaining to a plurality of distinct spaces within a building as in claim 12, wherein the database stores information regarding income generated for distinct spaces;

wherein the host device is programmed to retrieve the stored income information for the distinct spaces of the selected building for a predetermined range of time from the database and to calculate an average income per square foot for the selected building; and wherein the host device is programmed to generate a graph indicating the average income per square foot for the selected building over the predetermined range of time and to cause the display device to display the generated graph.

20. The apparatus for presenting information pertaining to a plurality of distinct spaces within a building as in claim 12, wherein the host device is programmed to detect the position of a cursor of the display device at one of the space indicators;

wherein the host device is programmed to retrieve additional stored information for the distinct space corresponding to the space indicator at which the cursor is detected from the database; and wherein the host device is programmed to generate a window with the retrieved additional stored information for the distinct space at the position of the cursor and to cause the display device to display the generated window.

21. The apparatus for presenting information pertaining to a plurality of distinct spaces within a building as in claim 20, wherein the generated displayed window includes a drop down menu with a list of functions related to the distinct space that may be selected by the user for execution by the host device.

22. The apparatus for presenting information pertaining to a plurality of distinct spaces within a building as in claim 12, wherein at lease some of the distinct spaces within a building are rental spaces.

* * * * *